US012718448B2

(12) United States Patent
Lu et al.

(10) Patent No.: US 12,718,448 B2
(45) Date of Patent: Aug. 25, 2026

(54) APPARATUS AND METHOD FOR BEAM-HARDENING CORRECTION IN COMPUTED TOMOGRAPHY

(71) Applicant: CANON KABUSHIKI KAISHA, Tokyo (JP)

(72) Inventors: Yujie Lu, Vernon Hills, IL (US); Liang Cai, Vernon Hills, IL (US); Zhou Yu, Glenview, IL (US); Jian Zhou, Buffalo Grove, IL (US)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

(21) Appl. No.: 18/343,608

(22) Filed: Jun. 28, 2023

(65) Prior Publication Data

US 2025/0005818 A1 Jan. 2, 2025

(51) Int. Cl.
*G06T 12/30* (2026.01)
*G06T 12/20* (2026.01)

(52) U.S. Cl.
CPC .............. *G06T 12/30* (2026.01); *G06T 12/20* (2026.01); *G06T 2210/41* (2013.01); *G06T 2211/448* (2023.08)

(58) Field of Classification Search
CPC . G06T 11/008; G06T 11/006; G06T 2210/41; G06T 2211/448; G06T 11/005
See application file for complete search history.

(56) References Cited

U.S. PATENT DOCUMENTS 5,124,914 A 6/1992 Grangeat
8,135,111 B2 3/2012 Jaffray et al.
8,437,522 B2 5/2013 Zhou et al.
8,611,626 B2 12/2013 Miao et al.
9,373,159 B2 6/2016 Amroabadi et al.
9,384,566 B2 7/2016 Chen
9,943,274 B2 4/2018 Rousso et al.
10,134,155 B2 11/2018 Lachaine
10,970,887 B2 4/2021 Wang et al.
11,315,220 B2 4/2022 Ida et al.
11,331,064 B2 5/2022 Zhou et al.
11,416,984 B2 8/2022 Takeshima et al.
2014/0321608 A1 10/2014 Ueki et al.
2016/0202364 A1 7/2016 Wang et al.
2018/0235562 A1 8/2018 Petschke
2019/0180482 A1 6/2019 Takahashi et al.
(Continued)

OTHER PUBLICATIONS

Lennart R. Koetzier, Pub. Radiology 2023 (Year: 2023).*
(Continued)

*Primary Examiner* — Gregory A Morse
*Assistant Examiner* — Ty Mitchell Beatty
(74) *Attorney, Agent, or Firm* — Canon U.S.A., Inc. IP Division

(57) ABSTRACT

According to some embodiments, a method comprises obtaining a group of reconstructed-image data; converting the group of reconstructed-image data to a derivative of Radon space, thereby generating Radon-space data, wherein the Radon-space data have a radial sampling pattern in the derivative of Radon space; and generating resampled data by inputting the Radon-space data into a first trained machine-learning model for resampling Radon-space data, wherein the resampled data have a cone-beam-projection-geometry-shaped sampling pattern in the derivative of Radon space.

17 Claims, 20 Drawing Sheets

(56) References Cited

U.S. PATENT DOCUMENTS

| | | | |
|---|---|---|---|
| 2020/0196973 | A1 | 6/2020 | Zhou et al. |
| 2020/0202590 | A1 | 6/2020 | George et al. |
| 2021/0012543 | A1 | 1/2021 | Hein et al. |
| 2022/0128488 | A1 | 4/2022 | Zhan et al. |
| 2022/0233162 | A1 | 7/2022 | Zhan et al. |
| 2023/0083935 | A1 | 3/2023 | Lu et al. |

OTHER PUBLICATIONS

Hyoung Suk Park, Pub. Medical Physics 2018 (Year: 2018).*
Billy Junqi Tang, Pub. University of Edinburgh 2015 (Year: 2015).*
Ahmet Celik, Pub. Comptes rendus de l'Academie bulgare des Sciences 2023 (Year: 2023).*
Jiang Hsieh et al., An iterative approach to the beam hardening correction in cone beam CT, Med. Phys. 27 (1), Jan. 2000.
Peter M. Joseph et al., A method for simultaneous correction of spectrum hardening artifacts in CT images containing both bone and iodine, Medical Physics 24, 1629 (1997), Oct. 1997.
Marc Kachelrieß, Improving PET/CT Attenuation Correction with Iterative CT Beam Hardening Correction, 2005 IEEE Nuclear Science Symposium Conference Record, Oct. 2005.
Yiannis Kyriakou et al., Empirical beam hardening correction (EBHC) for CT, Medical Physics 37, 5179 (2010), Sep. 2010.
Hu Chen et al., Low-Dose CT with a Residual Encoder-Decoder Convolutional Neural Network (RED-CNN), Jul. 2017.
Eunhee Kang et al., Wavelet Domain Residual Network (WavResNet) for Low-Dose X-ray CT Reconstruction, Mar. 2017.
Lars Gjesteby et al., Reducing Metal Streak Artifacts in CT Images via Deep Learning: Pilot Results, The 14th International Meeting on Fully Three-Dimensional Image Reconstruction in Radiology and Nuclear Medicine, Jun. 2017.
C. Zhang et al., CT artifact reduction via U-net CNN, Proc. SPIE 10574, Medical Imaging 2018: Image Processing, 105741R (Mar. 5, 2018).
Heyi Li et al., Low-Dose CT Streak Artifacts Removal using Deep Residual Neural Network, The 14th International Meeting on Fully Three-Dimensional Image Reconstruction in Radiology and Nuclear Medicine, Jun. 2017.
Jonas Adler et al., Solving ill-posed inverse problems using iterative deep neural networks, May 2017.
Patrick Putzky et al., Recurrent Inference Machines for Solving Inverse Problems, Jun. 2017.
Jonas Adler et al., Learned Primal-dual Reconstruction, Jul. 2018.
Wei Zhao et al., Robust Beam Hardening Artifacts Reduction for Computed Tomography Using Spectrum Modeling, IEEE Transactions on Computational Imaging, vol. 5, No. 2, Jun. 2019.
Niloufar Teyfouri et al., An Exact and Fast CBCT Reconstruction via Pseudo-Polar Fourier Transform based Discrete Grangeat's Formula, Jun. 2019.
Berthold K.P. Horn, Grangeat's "trick", Apr. 2002.
M. Defrise et al., A Cone-Beam Reconstruction Algorithm Using Shift-Variant Filtering and Cone-Beam Backprojection, IEEE Transactions on Medical Imaging, vol. 13, No. 1, Mar. 1994.
Martin J. Willemink et al., The evolution of image reconstruction for CT—from filtered back projection to artificial intelligence, Eur Radiol (2019) 29:2185-2195, Oct. 2018.
Ilmar Hein et al., Three-Dimensional Two Material Based Beam Hardening Correction for Iterative Reconstruction, Jul. 2016.
Ilmar Hein et al., Three-Dimensional Two Material Based Beam Hardening Correction for Iterative Reconstruction (BHC3D2M), 4th International Conference on Image Formation in X-Ray Computed Tomography, Jul. 2016.
Billy Jungi Tang, The Non-uniform Fast Fourier Transform in Computed Tomography, Masters Report, University of Edinburgh, Aug. 2015.
Gabor T Herman et al., A Comparative Study of Two Postreconstruction Beam Hardening Correction Methods, IEEE Transactions on Medical Imaging, vol. MI-2, No. 3, Sep. 1983.
Peter M. Joseph et al. A Method for Correcting Bone Induced Artifacts in Computed Tomography Scanners, Journal of Computer Assisted Tomography, 2:100-108, Jan. 1978.
Pradyut Biswal et al., Implementation of Katsevich Algorithm for Helical Cone-Beam Computed Tomography using CORDIC, Proceedings of 2010 International Conference on Systems in Medicine and Biology, Dec. 2010.
Osama Ahmed et al., A Review of Common Beam Hardening Correction Methods for Industrial X-ray Computed Tomography, Sains Malaysiana 47(8)(2018): 1883-1890, Aug. 2018.
Hiroyuki Kudo et al., A New Approach to Exact Cone-Beam Reconstruction without Radon Transform, 1998 IEEE Nuclear Science Symposium Conference Record, Nov. 1998.
G. Van Gompel et al., Iterative correction of beam hardening artifacts in CT, Jul. 2011.

* cited by examiner

APPARATUS AND METHOD FOR BEAM-HARDENING CORRECTION IN COMPUTED TOMOGRAPHY

FIELD

This application generally concerns using machine learning and artificial neural networks to correct beam hardening in computed tomography.

BACKGROUND

Radiographic imaging can produce (e.g., reconstruct) images of an object's internal structures, such as the internal members of a patient's body. For example, computed tomography (CT) scans use multiple X-ray images of an object, which were taken from different angles, to reconstruct volume images of the interior of the object. However, beam hardening can degrade the quality of reconstructed images.

DETAILED DESCRIPTION

Figure 1:
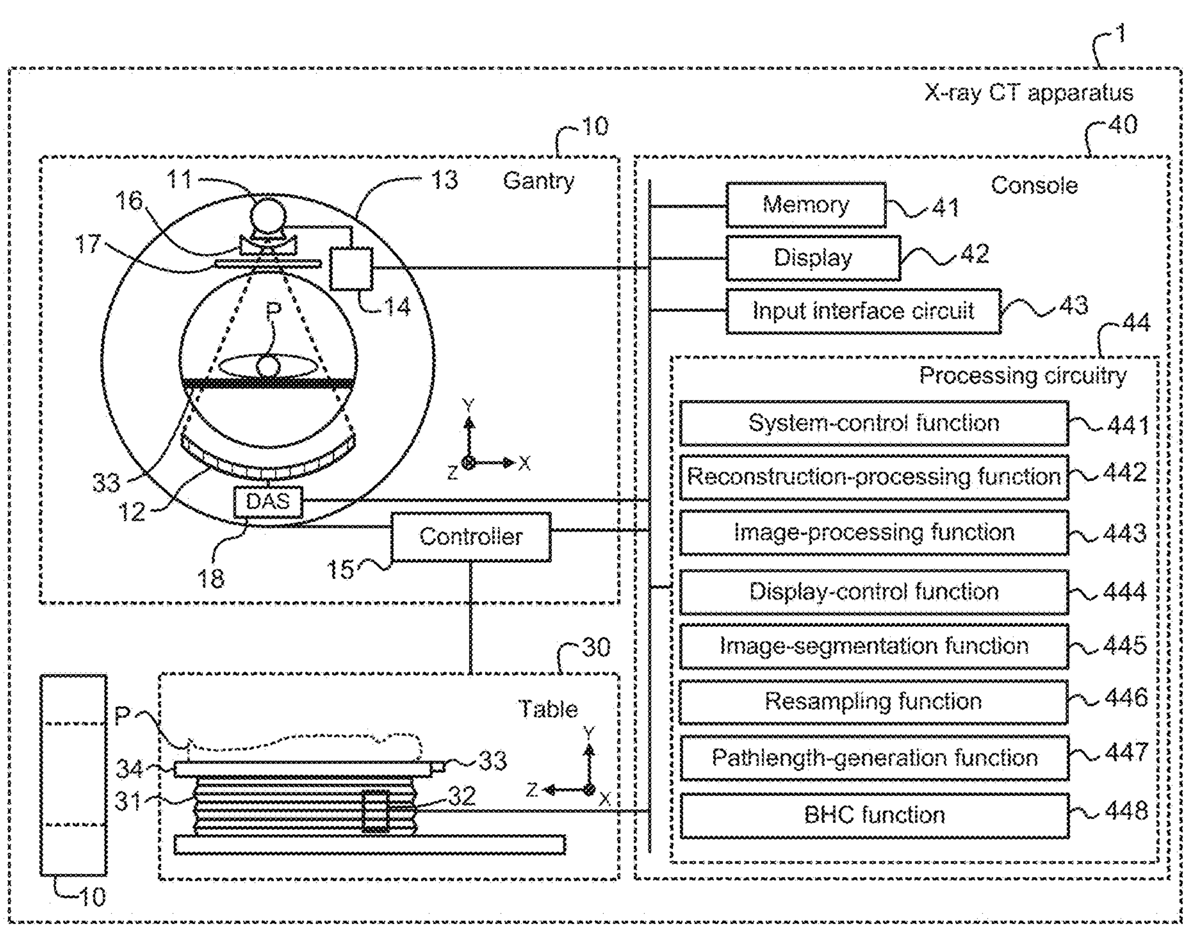
FIG. 1 illustrates an example embodiment of a medical-imaging apparatus.

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein. Furthermore, some embodiments include features from two or more of the following explanatory embodiments. Thus, features from various embodiments may be combined and substituted as appropriate.

Also, as used herein, the conjunction "or" generally refers to an inclusive "or," although "or" may refer to an exclusive "or" if expressly indicated or if the context indicates that the "or" must be an exclusive "or." Moreover, as used herein, the terms "first," "second," and so on, do not necessarily denote any ordinal, sequential, or priority relation and may be used to more clearly distinguish one member, operation, element, group, collection, set, etc. from another without expressing any ordinal, sequential, or priority relation.

And in the following description and in the drawings, like reference numerals designate identical or corresponding members throughout the several views.

Additionally, some embodiments are set forth in the following paragraphs:

(1) A method for generating computed-tomography (CT) data, the method comprising obtaining a group of reconstructed-image data; converting the group of reconstructed-image data to a derivative of Radon space, thereby generating Radon-space data, wherein the Radon-space data have a radial sampling pattern in the derivative of Radon space; and generating resampled data by inputting the Radon-space data into a first trained machine-learning model for resampling Radon-space data, wherein the resampled data have a cone-beam-projection-geometry-shaped sampling pattern in the derivative of Radon space.

(2) The method of (1), wherein converting the reconstructed-image data to the derivative of Radon space includes mapping the reconstructed-image data to Fourier space; generating Fourier slices from the reconstructed-image image data that has been mapped to Fourier space; generating scaled Fourier slices by scaling the Fourier slices; and performing radial inverse Fourier transforms on the scaled Fourier slices.

(3) The method of (1), further comprising generating first pathlength data based on the resampled data; and generating second pathlength data by applying a second trained machine-learning model to the first pathlength data, wherein the second trained machine-learning model has been trained based on third pathlength data, wherein the third pathlength data were obtained by applying a second pathlength-estimation process to one or more sets of reconstructed-image data, wherein the second pathlength-estimation process includes ray tracing.

(4) The method of (3), further comprising generating corrected projection data, wherein generating the corrected projection data includes performing beam-hardening correction on projection data based on the second pathlength data and on the projection data.

(5) The method of (4), further comprising generating reconstructed-image data based on the corrected projection data.

(6) The method of (1), wherein the group of reconstructed-image data is generated by segmenting a set of reconstructed-image data into two or more groups of reconstructed-image data, and wherein the two or more groups of reconstructed-image data include the group of reconstructed-image data.

(7) A medical image-processing method comprising obtaining a set of projection data obtained by scanning an object; generating a set of reconstructed-image data, wherein generating the set of reconstructed-image data includes performing a reconstruction process on the set of projection data; obtaining first data by applying first processing to a group of reconstructed-image data from the set of reconstructed-image data, wherein the first processing includes a Fourier-transform process; obtaining second data by applying a trained machine learning model to the first data, wherein the trained machine learning model is trained to compensate for accuracy degradation caused by the Fourier-transform process; and obtaining corrected projection data by applying a beam-hardening-correction process to the set of projection data based on the second data.

(8) The method of (7), wherein the first data have a radial sampling pattern in a derivative of Radon space, wherein the trained machine learning model is trained to resample data from the radial sampling pattern to a cone-beam-projection-shaped sampling pattern, and wherein the second data have the cone-beam-projection-shaped sampling pattern in the derivative of Radon space.

(9) The method of (8), wherein obtaining the corrected projection data by applying the beam-hardening-correction process to the set of projection data based on the second data includes converting the second data to projection space.

(10) The method of (7), wherein the trained machine learning model is trained based on projection-space data obtained by a process including forward-projection processing based on reconstructed-image data and on Fourier-transform processing based on the reconstructed-image data.

(11) The method of (7), further comprising generating reconstructed-image data based on the corrected projection data.

(12) An image-processing apparatus comprising one or more computer-readable storage media storing instructions and one or more processors. The one or more processors and the one or more computer-readable storage media are configured to control the apparatus to perform operations that include obtaining a set of projection data obtained by scanning an object; generating a set of reconstructed-image data, wherein generating the set of reconstructed-image data includes performing a reconstruction process on the set of projection data; obtaining first data by applying first processing to a group of reconstructed-image data from the set of reconstructed-image data, wherein the first processing includes a Fourier-transform process; obtaining second data by applying a trained machine learning model to the first data, wherein the trained machine learning model is trained to compensate for accuracy degradation caused by the Fourier-transform process; and obtaining corrected projection data by applying a beam-hardening-correction process to the set of projection data based on the second data.

(13) The image-processing apparatus of (12), wherein the first data have a radial sampling pattern in a derivative of Radon space, wherein the trained machine learning model is trained to resample data from the radial sampling pattern to a cone-beam-projection-shaped sampling pattern, and wherein the second data have the cone-beam-projection-shaped sampling pattern in the derivative of Radon space.

(14) The image-processing apparatus of (13), wherein obtaining the corrected projection data by applying the beam-hardening-correction process to the set of projection data based on the second data includes converting the second data to projection space.

(15) A medical-image-processing method, the method comprising obtaining a set of projection data, wherein the set of projection data was generated by scanning an object; generating a set of reconstructed-image data, wherein generating the set of reconstructed-image data includes performing a reconstruction process on the set of projection data; obtaining first pathlength data corresponding to a specific material by applying a first pathlength-estimation process on a first group of reconstructed-image data from the set of reconstructed-image data, wherein the first pathlength-estimation process includes a Fourier transform; obtaining second pathlength data corresponding to the specific material by applying a first trained machine-learning model to the first pathlength data, wherein the first trained machine-learning model has been trained based on third pathlength data, wherein the third pathlength data were obtained by applying a second pathlength-estimation process to one or more sets of reconstructed-image data, wherein the second pathlength-estimation process includes ray tracing; and generating corrected projection data, wherein generating the corrected projection data includes applying a beam-hardening-correction process to the set of projection data based on the second pathlength data.

(16) The method of (15), wherein the set of projection data was generated by scanning the object with cone-beam computed-tomography scanning.

(17) The method of (15), wherein the first pathlength-estimation process includes generating Radon-space data, which are defined in a derivative of Radon space, based on a Fourier-transform-based mapping of the group of reconstructed-image data to the derivative of Radon space; and applying a reverse Grangeat reconstruction method to the Radon-space data.

(18) The method (15), wherein the first group of reconstructed-image data is obtained by segmenting the set of reconstructed-image data into two or more groups of reconstructed-image data, wherein the two or more groups of reconstructed-image data include the first group of reconstructed-image data, and wherein each group of the two or more groups of reconstructed-image data corresponds to a specific material.

(19) The method of (18), wherein the first pathlength-estimation process includes generating first Radon-space data, which are defined in a derivative of Radon space, based on a Fourier-transform-based mapping of the first group of reconstructed-image data to the derivative of Radon space, wherein the first Radon-space data have a radial sampling pattern; and generating second Radon-space data based on the first Radon-space data, wherein generating the second Radon-space data includes applying a second trained machine learning model to the first Radon-space data, and wherein the second Radon-space data have a cone-beam-projection-geometry-shaped sampling pattern.

(20) The method of (19), wherein the segmenting is based on voxel values in the reconstructed-image data.

(21) A medical-image-processing method, the method comprising obtaining a set of projection data, wherein the set of projection data was generated by scanning an object; generating a set of reconstructed-image data, wherein generating the set of reconstructed-image data includes performing a reconstruction process on the set of projection data; obtaining first projection-space data based on a first group of reconstructed-image data from the set of reconstructed-image data by applying a process including a Fourier transform; obtaining second projection-space data by applying a trained machine learning model to the first projection-space data, wherein the first trained machine-learning model has been trained based on third projection-space data, wherein the third projection-space data were obtained by applying a second pathlength-estimation process to one or more sets of reconstructed-image data, wherein the second pathlength-estimation process includes ray tracing; and applying image processing based on the second projection-space data to the set of projection data or the set of reconstructed-image data.

(22) The method of (21), wherein the first group of reconstructed-image data corresponds to a material-basis image of a first material.

(23) The method of (21), wherein the image processing includes beam-hardening-correction processing.

FIG. 1 illustrates an example embodiment of a medical-imaging apparatus. In this example embodiment, the medical-imaging apparatus is an X-ray CT apparatus 1.

The X-ray CT apparatus 1 generates projection data (e.g., a sinogram) by scanning a subject P (e.g., patient) during a CT scan; generates reconstructed-image data (CT-image data), which may be referred to herein as medical image data and which define one or more medical images of the subject P, based on the projection data; and displays one or more medical images (CT images) that are defined by the reconstructed-image data (medical image data) on a display 42. Also, when generating the reconstructed-image data, the X-ray CT apparatus 1 may use one or more machine-learning models (e.g., artificial neural networks, such as feedforward neural networks, convolutional neural networks, deep neural networks, and recurrent neural networks) to perform beam-hardening correction.

In CT imaging, the X-ray source (e.g., X-ray tube 11) is polychromatic, and the attenuation of X-rays through tissue is frequency (i.e., energy) dependent. Higher energy photons are attenuated less than lower energy photons, thus the X-rays that reach the detector (e.g., X-ray detector 12) are “harder” than those that left the X-ray source. If not accounted for, this effect will cause artifacts (beam-hardening artifacts) to appear in the medical images. The primary contributors to beam hardening are usually soft tissues with densities close to water, as well as bone or iodine contrast. Beam-hardening artifacts may include cupping (for example, with soft tissue beam hardening) as well as dark streaks and bands. And beam-hardening artifacts caused by bone may include dark streaks or bands between high density bone structures, such as bones in the skull.

The X-ray CT apparatus 1 includes one or more gantries 10, one or more tables 30, and a console 40. Although, for purposes of explanation, the X-ray CT apparatus 1 in FIG. 1 includes two gantries 10 and two tables 30, some embodiments include more or fewer gantries 10 and tables 30. For example, some embodiments of the X-ray CT apparatus 1 include only one gantry 10 and only one table 30.

Also, in FIG. 1, the rotation axis of a rotation frame 13 in a non-tilted state is defined as a Z-axis direction; a direction orthogonal to the Z-axis direction and extending from the rotation center to a post that supports the rotation frame 13 is defined as an X-axis direction; and the direction orthogonal to the Z-axis and the X-axis is defined as a Y-axis direction.

Each gantry 10 includes an X-ray tube 11, an X-ray detector 12 (detector 12), a rotation frame 13, an X-ray high-voltage circuit 14, a controller 15, a wedge 16, a collimator 17, and a data-acquisition system (DAS) 18.

The X-ray tube 11 may be a vacuum tube that is configured to generate the X-rays by emitting thermo electrons from a negative pole (a filament) toward a positive pole (a target), with application of high voltage from the X-ray high-voltage circuit 14. The X-ray tube 11 generates X-ray beams that spread with the fan angle and the cone angle. Examples of the X-ray tube 11 include a rotating anode X-ray tube by which the X-rays are generated as a result of emitting the thermo electrons onto a rotating positive pole (anode). The hardware for generating X-rays is not limited to the X-ray tube 11. For example, in place of the X-ray tube 11, a fifth-generation system, including a focus coil configured to focus electron beams generated from an electron gun, a deflection coil configured to perform electromagnetic deflection, and a target ring configured to surround a semi-perimeter of the subject P and generate X-rays through collision of the deflected electron beams, may be used to generate X-rays.

The wedge 16 is a filter used for adjusting the X-ray amount radiated from the X-ray tube 11. More specifically, the wedge 16 is a filter configured to pass and attenuate the X-rays radiated from the X-ray tube 11 such that the X-rays radiated from the X-ray tube 11 onto the subject P have a predetermined distribution. For example, the wedge 16 (e.g., a wedge filter, a bow-tie filter) may be a filter obtained by processing aluminum so as to have a predetermined target angle and a predetermined thickness.

The collimator 17 is configured with lead plates or the like used for narrowing down the X-rays that have passed through the wedge 16 into the X-ray radiation range and is configured to form a slit with a combination of the plurality of lead plates or the like. The collimator 17 may be referred to as an X-ray diaphragm.

The X-ray detector 12 is configured to detect X-rays that were radiated from the X-ray tube 11 and that have passed through the subject P, and the X-ray detector 12 is configured to output electric signals corresponding to the amount of detected X-rays to the DAS 18. The X-ray detector 12 may include, for example, a plurality of rows of X-ray detecting elements, in each of which a plurality of X-ray detecting elements are arranged in a channel direction along an arc centered on a focal point of the X-ray tube 11. For example, the X-ray detector 12 may have a structure in which the plurality of rows of X-ray detecting elements, in which the plurality of X-ray detecting elements are arranged in the channel direction, are arranged in a slice direction (called a row direction). Also, each X-ray detecting element may output a respective electric signal.

The X-ray detector 12 may be, for example, a detector of an indirect conversion type including a grid (anti-scatter grid), a scintillator array, and an optical-sensor array.

The scintillator array includes a plurality of scintillators. Each of the scintillators includes a scintillator crystal that outputs light having a photon quantity corresponding to the amount of the X-rays that have become incident thereto.

The grid is disposed on the surface of the scintillator array that is positioned on the X-ray incident side, and the grid includes an X-ray blocking plate having a function of absorbing scattered X-rays. The grid may be referred to as a collimator (one dimensional collimator or two dimensional collimator).

The optical-sensor array has a function of converting the amount of light from the scintillators into an electric signal that corresponds to the amount of light from the scintillators. The optical-sensor array may include, for example, an optical sensor, such as a photomultiplier tube (PMT).

Also, the X-ray detector 12 may be a direct-conversion detector, including a semiconductor element that converts incident X-rays into electric signals.

And some embodiments are applicable to a single-tube X-ray CT apparatus and are also applicable to an X-ray CT apparatus in which two or more pairs, that each include a respective X-ray tube 11 and X-ray detector 12, are mounted on the rotation frame 13, which may be referred to as a multi-tube X-ray CT apparatus.

Figure 2A:
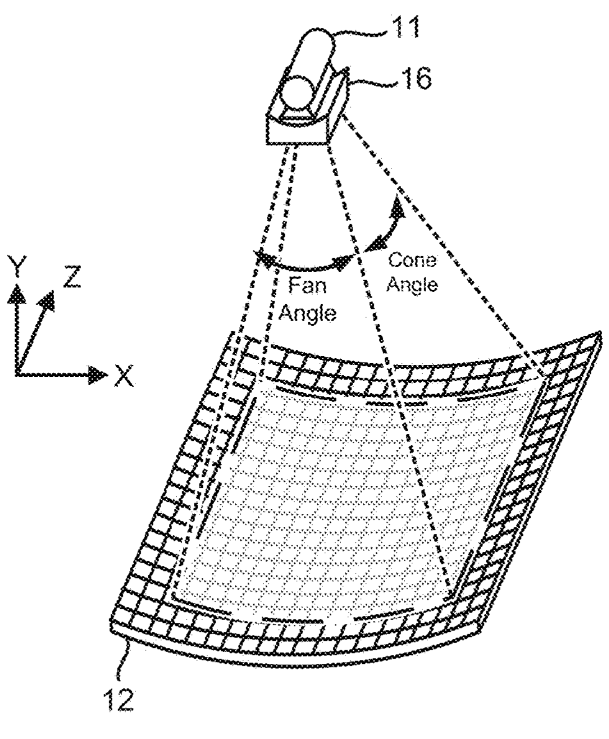
FIG. 2A illustrates an example of a cone beam that is emitted by an X-ray tube.
Figure 2B:
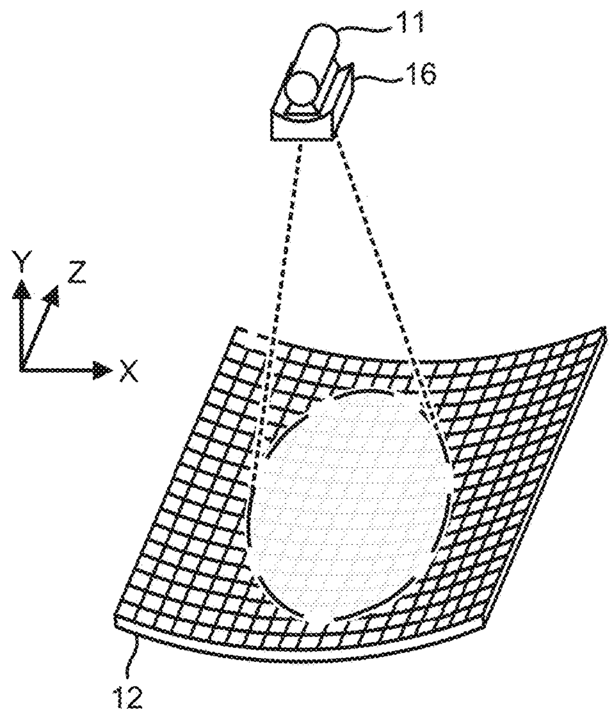
FIG. 2B illustrates an example of a cone beam that is emitted by an X-ray tube.

In this embodiment, the X-ray tube 11 emits the X-rays in the form of a cone beam (a tapering beam). Examples of the forms of cone beams include a rectangular pyramid, a square pyramid, a circular cone, and an elliptical cone. For example, FIGS. 2A-B illustrate examples of cone beams that are emitted by embodiments of the X-ray tube 11. In FIG. 2A, the cone beam is in the form of a rectangular pyramid, and FIG. 2A also notes the fan angle and the cone angle of the cone beam. In FIG. 2B, the cone beam has a conical form. Thus, the X-ray CT apparatus 1 may perform cone-beam CT imaging (e.g., wide cone-beam CT imaging).

Additionally, the X-ray detector 12 has a curved detection surface. However, the X-ray detector 12 may also have a flat detection surface in some embodiments. And the X-ray detector 12 is an example of an X-ray detecting unit.

The X-ray high-voltage circuit 14 includes a high-voltage generating circuit that includes an electric circuit of a transformer, a rectifier, etc., and that has a function of generating a high voltage to be applied to the X-ray tube 11, and the X-ray high-voltage circuit 14 includes an X-ray controller that controls an output voltage corresponding to the X-rays that are emitted by the X-ray tube 11. The high-voltage generating circuit may employ a transformer system or an inverter system. The X-ray high-voltage circuit 14 may be provided on a rotation frame 13 (described below) or may be provided on the side of a fixed frame (not illustrated in FIG. 1) of the gantry 10. Note that the fixed frame is a frame that supports the rotation frame 13 rotatably. The X-ray high-voltage circuit 14 is an example of an X-ray high-voltage unit.

The data-acquisition system (DAS) 18 includes an amplifier that performs amplification processing on the electric signal that is output from each X-ray detecting element of the X-ray detector 12 and includes an A/D converter that converts the electric signal into a digital signal, and the DAS 18 generates projection data (detection data). The projection data indicate the X-rays that are measured by the X-ray detector 12 (indicate measured projections). The projection data that are generated by the DAS 18 are transferred to the console 40. The DAS 18 is an example of a data collecting unit. Also, a CT scan may produce a respective set of projection data, and the set of projection data may include subsets of projection data (groups of measured-projection data) that were captured at respective detection angles.

Also, in this embodiment, the X-ray tube 11 and the X-ray detector 12 are configured to rotate around the subject P. Thus, at different detection angles relative to the subject P, the X-ray tube 11 emits X-rays that travel through the scanned region of the subject P and are detected by the X-ray detector 12. Also, a group of detected X-rays that were radiated from the X-ray tube 11 and that have passed through the subject P and that were detected together (e.g., when the X-ray tube 11 and the X-ray detector 12 were at a certain detection angle relative to the subject P) may be referred to as a measured projection, and the corresponding data may also be referred to as a group of measured-projection data. At each of the detection angles, the X-ray detector 12 generates a respective group of measured-projection data, and each group of measured-projection data defines a respective measured projection. Additionally, each group of measured-projection data may constitute a subset in the set of projection data that is generated by the scanning operation. Furthermore, a set of projection data may define a sinogram.

Figure 3:
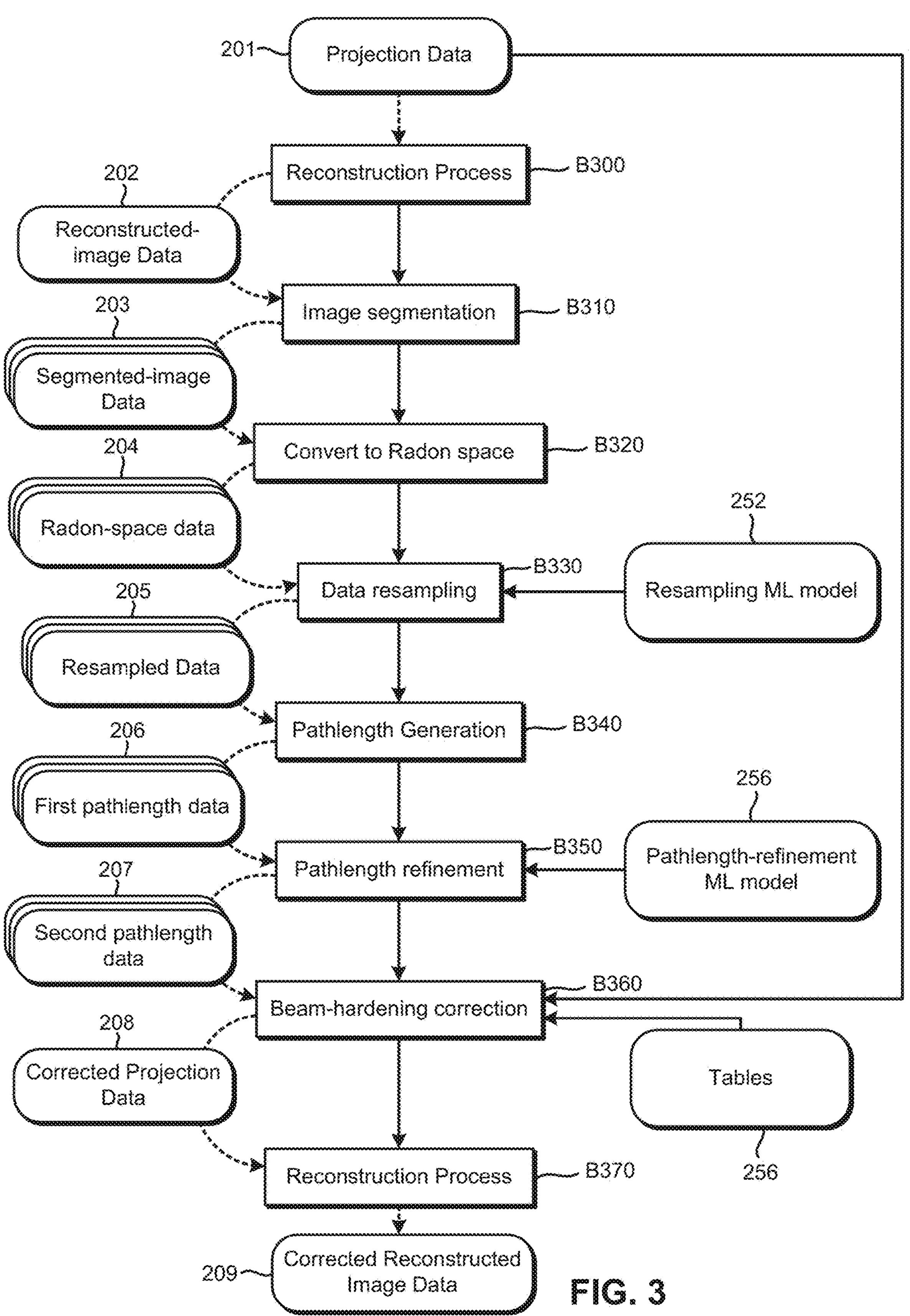
FIG. 3 illustrates an example embodiment of a method for generating reconstructed-image data.

The rotation frame 13 is an annular frame that supports the X-ray tube 11 and the X-ray detector 12 such that the X-ray tube 11 and the X-ray detector 12 are opposed to each other. A controller 15 (described below) causes the rotation frame 13 to rotate the X-ray tube 11 and the X-ray detector 12 (for example, as illustrated in FIG. 3). The rotation frame 13 may further support, in addition to the X-ray tube 11 and the X-ray detector 12, the X-ray high-voltage circuit 14 and the DAS 18.

The rotation frame 13 is supported by a non-rotation part of the gantry 10 (for example, the fixed frame, which is not illustrated in FIG. 1) such that the rotation frame 13 is rotatable. The rotation mechanism includes, for example, a motor that generates a rotary drive force and a bearing that transmits the rotary drive force to the rotation frame 13 and rotates the rotation frame 13. The motor is provided on, for example, the non-rotation part. The bearing is physically connected to the rotation frame 13 and the motor. And the rotation frame 13 rotates in accordance with the rotary drive force of the motor.

Each of the rotation frame 13 and the non-rotation part is provided with a noncontact-type or contact-type communication circuit, by which communication is performed between a component supported by the rotation frame 13 and the non-rotation part or an external device of the gantry 10. When, for example, optical communication is employed as a noncontact communication method, the projection data that are generated by the DAS 18 are transmitted, by optical communication, from a transmitter that is provided on the rotation frame 13 and that has a light-emitting diode (LED) to a receiver that is provided on a non-rotation part of the gantry 10 and that has a photodiode, and the receiver then transmits the projection data from the non-rotation part to the console 40. Some embodiments also use, as the communication method, a noncontact-type data-transmission method, such as a capacitance-coupling method or a radio-wave method, or a contact-type data-transmission method, such as a contact-type data-transmission method that uses a slip ring and an electrode brash.

Also, the rotation frame 13 is an example of a rotation unit.

Furthermore, some embodiments of the X-ray CT apparatus 1 can perform upright CT scans. Accordingly, these embodiments include gantries that are configured to accommodate upright scanning, and some embodiments do not include the table 30. For example, some embodiments include a gantry 10 that is configured to rotate the rotation frame 13 around a standing subject P, and are thus configured to rotate about an axis of rotation that is perpendicular to the axis of rotation of the rotation frame 13 that is shown in FIG. 1 (are configured to rotate about the Y-axis in the orientation in which it is illustrated in FIG. 1). Also, some embodiments include a patient-supporting mechanism (e.g., a seat) that is different from the table 30 or omit the patient-supporting mechanism. And some embodiments (e.g., embodiments that perform dental CT scanning) omit parts of the gantry 10 or have a gantry 10 that is configured to perform dental CT scanning.

And the X-ray CT apparatus 1 is available in various types, such as a rotate/rotate type (a third-generation CT) in which the X-ray tube 11 and the detector 12 integrally rotate around the subject P and a stationary/rotate type (a fourth-generation CT) in which a large number of X-ray detecting elements in a ring-shaped array are fixed, while only the X-ray tube 11 rotates around the subject P. Any type is applicable to the present embodiments.

The controller 15 includes circuitry, such as processing circuitry (which includes a CPU or the like), and a drive mechanism, such as a motor and an actuator. Furthermore, the controller 15 has a function of receiving an input signal from an input interface circuit 43 (described below) that is attached to the console 40 or to the gantry 10 and a function of controlling operations of the gantry 10 and the table 30. For example, the controller 15 is configured to exercise control, upon receipt of input signals, to cause the rotation frame 13 to rotate, to cause the gantry 10 to tilt, and to cause the table 30 and the table top 33 to operate. In this situation, the control to tilt the gantry 10 is realized as a result of the controller 15 rotating the rotation frame 13 on an axis parallel to the X-axis direction, according to tilting angle (tilt angle) information input through an input interface circuit 43 attached to the gantry 10. Additionally, the controller 15 may be provided for the gantry 10 or for the console 40. The controller 15 is an example of a control unit.

The table 30 is a device on which the subject P is positioned and moved, and the table 30 includes a base 31, a table drive circuit 32, the table top 33, and a support frame 34.

The base 31 is a casing that supports the support frame 34 movably and perpendicularly. The table drive circuit 32 includes a motor or an actuator that causes the table top 33, on which the subject P may be laid in the longitudinal direction of the table top 33, to move. The table top 33 that is provided on a top surface of the support frame 34 is a board on which the subject P is laid. In addition to moving the table top 33, the table drive circuit 32 may move the support frame 34 in the longitudinal direction of the table top 33.

The console 40 includes circuitry and other hardware. The circuitry and other hardware include the following: a memory 41, a display 42, an input interface circuit 43, and processing circuitry 44. Note that although the console 40 and the gantry 10 are explained herein as different devices, the gantry 10 may include the console 40 or at least some of the components of the console 40.

The memory 41 is implemented using, for example, a random access memory (RAM), a semiconductor memory (e.g., a flash memory), a hard disk, an optical disk, or the like. The memory 41 stores, for example, projection data, reconstructed-image data, machine-learning models, and beam-hardening-correction models. The memory 41 is an example of storage and an example of a storage unit. Furthermore, storage for storing the projection data and the reconstructed-image data are not limited to the memory 41 of the console 40, and a cloud server that is connectable to the X-ray CT apparatus 1 via a communication network, such as the Internet, may store the projection data and the reconstructed-image data when receiving a store request from the X-ray CT apparatus 1.

The display 42 displays various types of information. For example, the display 42 outputs a medical image (CT image) that is generated by the processing circuitry 44 and outputs a graphical user interface (GUI) for receiving various operations from the operator. Also for example, the display 42 may be a liquid-crystal display or a cathode-ray-tube (CRT) display. The display 42 may be provided on the gantry 10, and the display 42 may be a desktop type or may be a tablet terminal or the like that is capable of performing wireless communication with the body of the console 40. And the display 42 is an example of a display unit.

The input interface circuit 43 receives various input operations from the operator, converts the received input operations into electric signals, and outputs the electric signals to the processing circuitry 44. For example, the input interface circuit 43 receives, from the operator, the following: collection conditions on collecting projection data, reconstruction conditions on reconstructing a CT image, and image-processing conditions on generating a post-processed image from a CT image. Also, for example, the input interface circuit 43 may be implemented using a mouse, a keyboard, a trackball, a switch, a button, a joystick, or a touchscreen. The input interface circuit 43 is an example of an input unit. Additionally, the input interface circuit 43 may be provided on the gantry 10. And the input interface circuit 43 may be configured by a tablet terminal or the like that is capable of performing wireless communication with the body of the console 40.

The processing circuitry 44 controls the operations of the X-ray CT apparatus 1. The processing circuitry 44 includes one or more central processing units (CPUs), such as microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). And the processing circuitry 44 is an example of a processing unit.

The processing circuitry 44 performs, for example, a system-control function 441, a reconstruction-processing function 442, an image-processing function 443, a display-control function 444, an image-segmentation function 445, a resampling function 446, a pathlength-generation function 447, and a beam-hardening-correction (BHC) function 448. Furthermore, the processing circuitry 44 may cooperate with the memory 41 to perform the functions.

The system-control function 441 controls various functions of the processing circuitry 44 based on input operations that are received from the operator via the input interface circuit 43. The system-control function 441 is an example of a control unit.

The reconstruction-processing function 442 generates reconstructed-image data (medical image data) by performing reconstruction processing using, for example, a filter correction back projection method, a Feldkamp-Davis-Kress (FDK) algorithm, iterative reconstruction, a successive approximation reconstruction method, etc., on projection data, which may include corrected projection data (projection data on which beam-hardening correction has been performed). The reconstruction-processing function 442 is an example of a reconstruction-processing unit.

The reconstruction-processing function 442 may also perform pre-processing (e.g., logarithmic transformation and offset correction processing, sensitivity correction processing between channels, and beam hardening correction) on the projection data that are output from the DAS 18. The data before the pre-processing and the data after the pre-processing may both be referred to as projection data. Also, the projection data before the pre-processing may be referred to as detection data, and the projection data after the pre-processing may be referred to as preprocessed projection data.

The image-processing function 443 converts the reconstructed-image data generated by the reconstruction-processing function 442 into tomographic-image data on a freely selected cross section or three-dimensional image data by a known method based on an input operation that is received from the operator via the input interface circuit 43. And the generation of the three-dimensional image data may be performed directly by the reconstruction-processing function 442. The image-processing function 443 is an example of an image-processing unit.

The display-control function 444 controls the display of images that are based on the three-dimensional image data or the tomographic-image data on the display 42. The formatting of the display may be based on input operations that are received from the operator via the input interface circuit 43. And the display-control function 444 is an example of a display-control unit.

The image-segmentation function 445 performs one or more segmentation processes on reconstructed-image data to segment the reconstructed-image data, which generates groups of segmented-image data from the reconstructed-image data. And the image-segmentation function 445 is an example of an image-segmentation unit.

The resampling function 446 converts segmented-image data to a derivative of Radon space and resamples groups of data in the derivative of Radon space, thereby generating resampled data. The resampling changes the sampling pattern of the data in the derivative of Radon space from a radial sampling pattern to a cone-beam-projection-geometry-shaped (CBPG-shaped) sampling pattern. And the resampling function 446 is an example of a resampling unit.

The pathlength-generation function 447 generates first pathlength data from resampled data and generates second pathlength data from first pathlength data. And the pathlength-generation function 447 is an example of a pathlength-generation unit.

The BHC function 448 performs beam-hardening correction on projection data based on the projection data and on pathlength data (e.g., first pathlength data, second pathlength data). And the beam-hardening correction may also be based on one or more beam-hardening-correction models (e.g., tables, fitting models). And the BHC function 448 is an example of a BHC unit.

Although the console 40 is explained such that the single console performs the functions, at least some of the functions may be performed by different consoles. For example, the functions of the processing circuitry 44, such as the reconstruction-processing function 442, may be provided decentrally.

Additionally, the processing circuitry 44 may be included in a device other than the console 40. For example, the processing circuitry 44 may be included in an integrated server that collectively performs processing on the projection data that are acquired by two or more medical-image diagnosis apparatuses (e.g., X-ray CT apparatuses 1).

FIG. 3 illustrates an example embodiment of a method for generating reconstructed-image data. Although this operational flow and the other operational flows that are described herein are each presented in a certain order, some embodiments may perform at least some of the operations in different orders than the presented orders. Examples of different orders include concurrent, parallel, overlapping, reordered, simultaneous, incremental, and interleaved orders. And some embodiments of the operational flows may include blocks from two or more of the operational flows that are described herein. Thus, other embodiments of the operational flows that are described herein may omit blocks, add blocks, change the order of the blocks, combine blocks, or divide blocks into more blocks.

Furthermore, although this operational flow and the operational flows that are described in FIGS. 5, 6, 8, 9, 10, and 11 are performed by a console 40, some embodiments of these operational flows are performed by two or more consoles, by one or more other specially-configured computing devices (e.g., medical-image-processing devices), or by one or more consoles working with one or more other specially-configured computing devices.

The flow starts in block B300, where a console generates reconstructed-image data 202 by performing a reconstruction process on obtained cone-beam projection data 201, for example by using filtered back projection, the Feldkamp-Davis-Kress (FDK) algorithm, the Tuy-Smith-Grangeat algorithm, or iterative reconstruction. The reconstructed-image data 202 includes volumetric medical-image data, which is constituted by voxels, such as a three-dimensional array of voxels. Each voxel represents a particular location or volume in three-dimensional space, and each voxel has a respective voxel value. For example, each voxel value may be an intensity value that represents the attenuation of the applied X-ray radiation provided at the location or volume represented by the voxel. The intensity value may also be referred to as an image value, gray value, gray level, or CT value, and the voxel value may be proportional to an X-ray absorption coefficient. The voxel value may be measured in Hounsfield units (HU). Commonly used volume-rendering techniques use a transfer function to map each of a series of sampled voxel values to an opacity value and a color value (usually represented by a combination of red, green, and blue color values).

Next, in block B310, the console performs image segmentation to segment the reconstructed-image data 202 into groups of segmented-image data 203 (segmented-image data 203 may also be referred to herein as material-component-image data 203). For example, the image segmentation can use thresholding that is based on the voxel values. And the image segmentation can be performed via a variety of machine-learning techniques, such as neural networks, support vector machines, and the like. And the image segmentation may segment each voxel into one of air, water, soft tissue, bone, contrast agent, and the like in accordance with the voxel value.

Each group of the groups of segmented-image data 203 (segmented-image-data group 203) corresponds to a respective material (e.g., bone, water, soft tissue, contrast agent) and includes the voxels that have data values that correspond to the respective material. For example, the console may segment the reconstructed image that is defined by the reconstructed-image data 202 into a plurality of material-component images, and each material-component image is defined by a respective group of material-component-image data 203 (segmented-image data 203). Also, each group of material-component-image data 203 includes the voxels from the reconstructed-image data 202 that represent a respective corresponding material. For example, one group of material-component-image data may include only the voxels from the reconstructed-image data 202 that represent bone (i.e., only the voxels that have values that correspond to bone), one group of material-component-image data may include only the voxels from the reconstructed-image data 202 that represent water (i.e., only the voxels that have values that correspond to water), one group of material-component-image data may include only the voxels from the reconstructed-image data 202 that represent soft tissue (i.e., only the voxels that have values that correspond to soft tissue), or one group of material-component-image data may include only the voxels from the reconstructed-image data 202 that represent contrast agent (i.e., only the voxels that have values that correspond to contrast agent).

Then, as described below in blocks B320-B340, the console maps the groups of segmented-image data 203 from image space to projection space without using ray-tracing forward projection.

Figure 5:
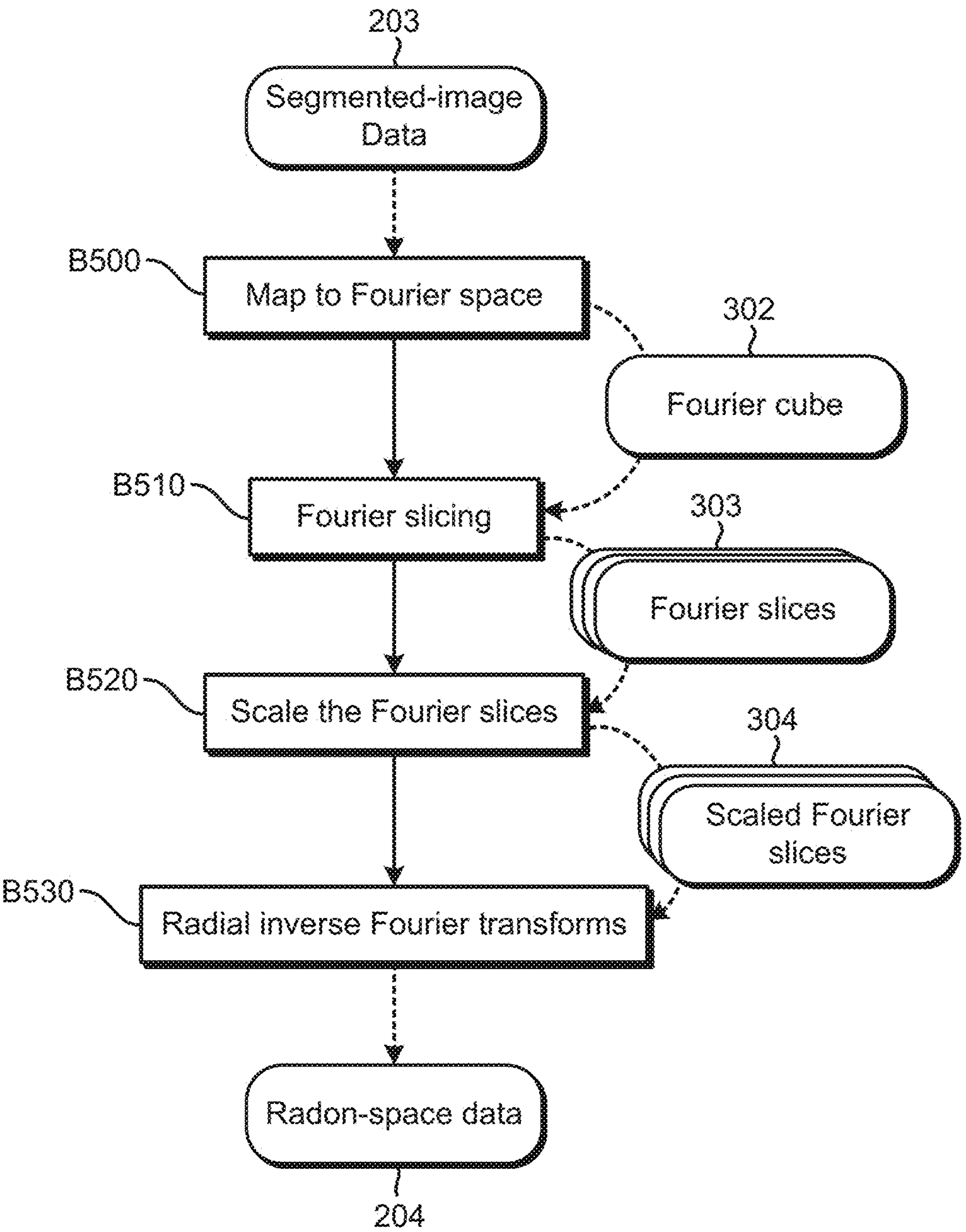
FIG. 5 illustrates an example embodiment of a Fourier-based mapping for converting segmented-image data to a derivative of Radon space.

In block B320, the console generates a respective group of Radon-space data 204 (i.e., a respective Radon-space-data group 204) for each group of segmented-image data 203 by converting each group of segmented-image data 203 to a derivative of Radon space using Fourier-transform-based mapping (e.g., a fast-Fourier-transform-based mapping), for example as described in FIG. 5. The Radon-space data 204 are radially sampled (have a radial sampling pattern) in the derivative of Radon space. Also, in cone-beam CT, the derivative of Radon space is three dimensional.

A reverse Grangeat reconstruction method (a reverse Grangeat method) can be used to convert data from the derivative of Radon space to projection space if the sampling pattern of the data in Radon space is a cone-beam-projection-geometry-shaped (CBPG-shaped) sampling pattern, which is approximately umbrella-shaped in the derivative of Radon space. However, the Radon-space data 204 that are generated in block B320 have a radial sampling pattern in the derivative of Radon space.

Thus, as part of the mapping of the groups of segmented-image data 203 from image space to projection space, the console resamples the groups of Radon-space data 204, which have a radial sampling pattern, into groups of data that have a CBPG-shaped sampling pattern.

Accordingly, in block B330, the console performs data resampling on the groups of Radon-space data 204 to generate a respective group of resampled data 205 (resampled-data group 205) for each group of the groups of Radon-space data 204. And each group of resampled data 205 has a CBPG-shaped sampling pattern. To perform the data resampling in block B330, the console applies a resampling machine-learning (ML) model 252 using a group of Radon-space data 204 as inputs. The resampling ML model 252 is a machine-learning model, such as a neural network, that has been trained to resample radially-sampled groups of Radon-space data 204 with a CBPG-shaped resampling pattern. And the resampling ML model 252 accepts a group of Radon-space data 204 as inputs and outputs a respective group of resampled data 205 that is based on the input group of Radon-space data 204.

Furthermore, in block B330, the console may use multiple resampling ML models 252, each of which corresponds to a respective material. For example, one resampling ML model 252 may correspond to bone, one resampling ML model 252 may correspond to water, one resampling ML model 252 may correspond to soft tissue, or one resampling ML model 252 may correspond to contrast agent. And a group of Radon-space data 204 that is input to such a resampling ML model 252 may be generated from segmented-image data 203 that correspond to the same material as the resampling ML model 252.

Figure 4:
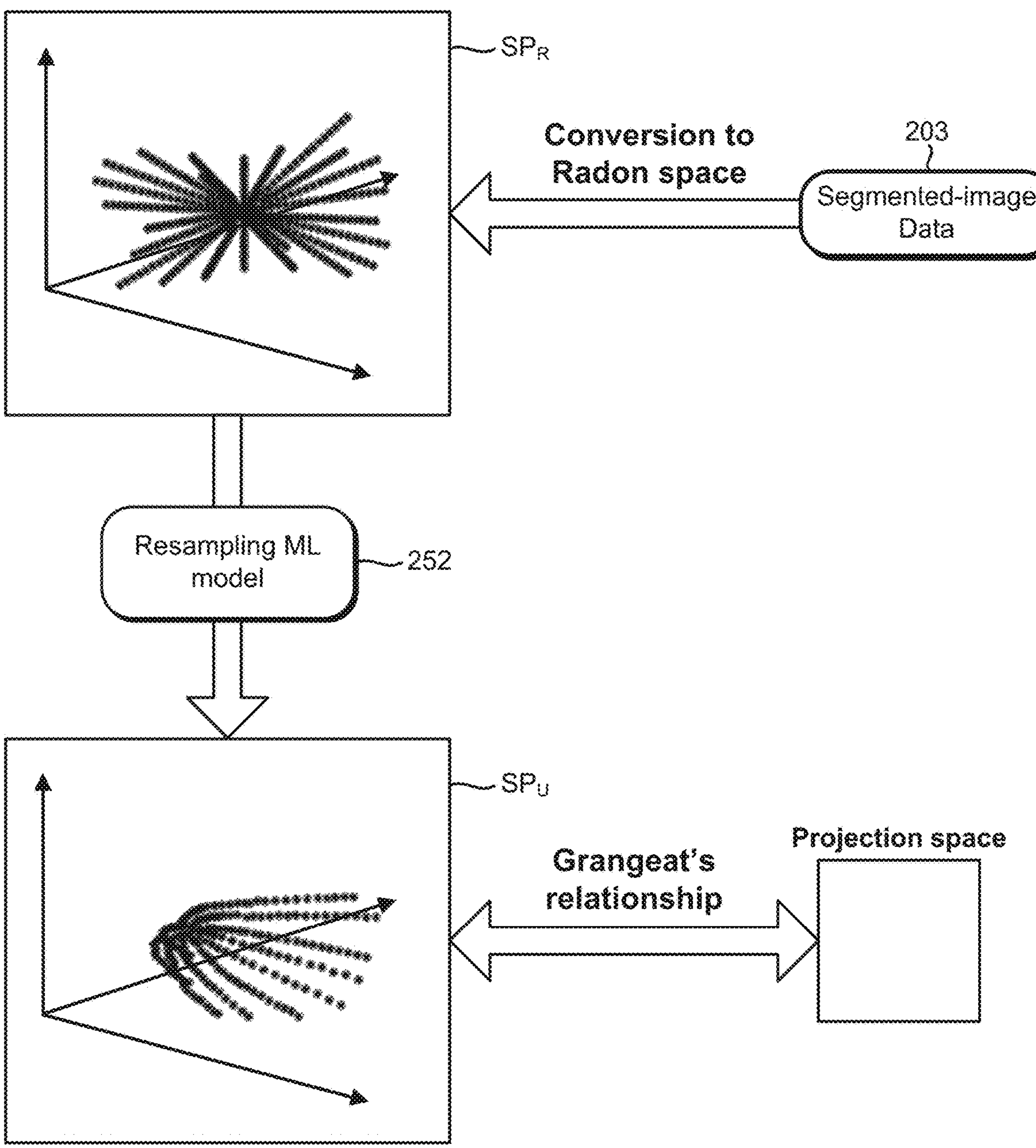
FIG. 4 schematically illustrates the relationship between the sampling pattern of Radon-space data and the sampling pattern of resampled data.

FIG. 4 schematically illustrates the relationship between the sampling pattern $SP_R$ of the Radon-space data 204 and the sampling pattern $SP_U$ of the resampled data 205. The sampling pattern $SP_R$ of the Radon-space data 204 is a radial sampling pattern in the derivative of Radon space, and the sampling pattern $SP_U$ of the resampled data 205 is a CBPG-shaped sampling pattern in the derivative of Radon space (to simplify FIG. 4, the sampling pattern for only one cone-beam CT projection is shown), which is approximately umbrella shaped. As noted above, using Fourier slicing generates a radial sampling pattern in the derivative of Radon space, but Grangeat's relationship can be used to convert data from the derivative of Radon space to projection space (the space in which the projection data 201 were acquired), and vice versa, if the data have a CBPG-shaped sampling pattern in the derivative of Radon space. Thus, Grangeat's relationship cannot be used to convert the Radon-space data 204 that have a radial sampling pattern to projection space and vice versa. But the trained resampling ML model 252 resamples the groups of Radon-space data 204 into groups of resampled data 205 that have a CBPG-shaped sampling pattern. And Grangeat's relationship can then be used to convert the groups of resampled data 205 to projection space.

The flow then proceeds to block B340, where the console generates a group of respective first pathlength data 206 (initial pathlength-data group 206) for each group of resampled data 205, for example by converting each group of resampled data 205 to projection space according to a reverse Grangeat method. An example embodiment of the operations in block B340 is described in FIG. 6. The first pathlength data 206 (projection length data) are defined in projection space, and a group of first pathlength data 206 may define a sinogram. Because each group of resampled data 205 corresponds to a respective group of segmented-image data 203, which has a respective corresponding material, the group of first pathlength data 206 for each group of resampled data 205 indicates respective pathlengths (projection lengths) through a respective corresponding material. Also, a group of first pathlength data 206 may be projection data that include only the projection data that correspond to one group of segmented-image data 203 (or to the corresponding material-component image), and thus do not include any projection data that correspond to any other group of segmented-image data 203. And one group of first pathlength data 206 indicates the result of mapping one group of segmented-image data 203 to projection space.

Therefore, in blocks B320-B340, the console maps the segmented-image data 203 from image space to projection space without using ray-tracing forward projection, which is very computationally expensive and often very time consuming. This allows the mapping of the segmented-image data 203 from image space to projection space to be performed more quickly.

While a reverse Grangeat method can be used to convert data from the derivative of Radon space to projection space more quickly than forward projection, a conversion that uses a reverse Grangeat method may not be as accurate as forward projection. Accordingly, some embodiments include block B350. In block B350, the console performs pathlength refinement on groups of first pathlength data 206 to generate respective groups of second pathlength data 207 (refined-pathlength-data groups 207), which are also defined in projection space. In block B350, the console applies a pathlength-refinement ML model 256 to perform the pathlength refinement. The pathlength-refinement ML model 256 is a machine-learning model, such as a neural network, that has been trained to output pathlength data that are closer to (including identical to) the pathlength data that would be generated by forward projection of the corresponding segmented-image data 203 of a group of first pathlength data 206 to projection space. Thus, the pathlength-refinement ML model 256 may be trained based on pathlength data that were obtained by performing a pathlength-estimation process that includes ray tracing on image data (e.g., segmented-image data 203). For example, the pathlength-estimation process may be a forward-projection process that includes ray tracing. Also, the pathlength data that were obtained by performing the pathlength-estimation process that includes ray tracing may be used as training targets. And the pathlength-refinement ML model 256 may accept a group of first pathlength data 206 as inputs and may output a respective group of second pathlength data 207 that is based on the input group of first pathlength data 206. Additionally, a group of second pathlength data 207 may be in the form of a sinogram.

Because each group of refined first pathlength data 206 also corresponds to a respective group of segmented-image data 203, which has a respective corresponding material, a group of second pathlength data 207 indicates respective pathlengths through a respective corresponding material. Also, a group of second pathlength data 207 may be projection data that include only the projection data that correspond to one group of segmented-image data 203 (or to the corresponding material-component image), and thus do not include any projection data that correspond to any other group of segmented-image data 203. And one group of second pathlength data 207 indicates the results of converting one group of segmented-image data 203 to projection space.

Furthermore, in block B350, the console may use multiple pathlength-refinement ML models 256, each of which corresponds to a respective material. For example, one pathlength-refinement ML model 256 may correspond to bone, one pathlength-refinement ML model 256 may correspond to water, one pathlength-refinement ML model 256 may correspond to soft tissue, or one pathlength-refinement ML model 256 may correspond to contrast agent. And a group of first-pathlength data 206 that is input to such a pathlength-refinement ML model 256 may be generated from segmented-image data 203 that correspond to the same material as the pathlength-refinement ML model 256.

The flow then advances to block B360, where the console performs beam-hardening correction based on the projection data 201 and the groups of second pathlength data 207. For example, the beam-hardening correction may also be based on one or more BHC models. In this embodiment, the one or more BHC models include tables 259. The output of the beam-hardening correction in block B360 is corrected projection data 208, which may be in the form of a sinogram.

For example, in some embodiments in which the segmentation segments the reconstructed-image data 202 into two materials (and thus into two segmented-image-data groups 203), the generation of the corrected projection data 208 can be described by the following:

$$PD_{BHC}(c,s,v) = PD_{IN}(c,s,v) + BHC3F(PL_1(c,s,v), PL_2(c,s,v)), \tag{1}$$

where $PD_{BHC}$ (c, s, v) is the corrected projection data 208 (e.g., corrected sinogram), where $PD_{IN}$ (c, s, v) is the projection data 201 (e.g., input projection data 201), where $PL_1$ (c, s, v) is a first group of second pathlength data 207 (e.g., a first pathlength sinogram), where $PL_2$ (c, s, v) is a second group of second pathlength data 207 (e.g., a second pathlength sinogram), where c is the index of the detector channel, where s is the index of the segment, where v is the index of the projection view, and where BHC3D is a table that acts as a correction table.

Additionally, if the number of materials increases from two materials to n materials, the generation of the corrected projection data 208 can be described by the following:

$$PD_{BHC}(c,s,v) = PD_{IN}(c,s,v) + BHC3F(PL_1(c,s,v), PL_2(c,s,v), \ldots, PL_n(c,s,v)), \tag{2}$$

where $PL_1$ (c, s, v), $PL_2$ (c, s, v), . . . , and $PL_n$ (c, s, v) are, respectively, groups of second pathlength data 207 that correspond to n different materials.

Also for example, in some embodiments, BHC3D can be described by the following:

$$BHC3D(c,s,l_1,l_2,\ldots,l_n) = \text{Log}(Po) - \text{Log}(PolyCnt) - \text{Log}(MonoCnt), \tag{3}$$

where $$MonoCnt = I_o \cdot e^{-l_1\mu_1(mono)+l_2\mu_2(mono)+\cdots+l_n\mu_n(mono)}; \tag{4}$$

where $$PolyCnt = \sum_{keV=1}^{kVp} I_o(keV) \cdot e^{-l_1\mu_1(keV)+l_2\mu_2(keV)+\cdots(l_n\mu_n(keV))}; \tag{5}$$

where $$Po = \sum_{keV=1}^{kVp} I_o(keV); \tag{6}$$

where $l_1$, $l_2$, . . . $l_n$ are the pathlengths of n different materials; where $\mu_1$, $\mu_2$, . . . $\mu_n$ are linear attenuation coefficients of the n different materials; and where $I_o$ is the post-wedge counts (counts of the X-ray source after any wedges and filters).

And, in embodiments that omit block B350, in block B360 the console may perform beam-hardening correction based on the groups of first pathlength data 206 instead of the groups of second pathlength data 207. Thus, in block B360, the groups of second pathlength data 207 may be replaced with the groups of first pathlength data 206.

Also, after block B360, the console may perform other processing in addition to the beam-hardening correction. For example, the console may perform metal-artifact-reduction (MAR) processing or forward-projection processing.

Finally, in block B370, the console generates corrected reconstructed-image data 209 by performing a reconstruction process on the corrected projection data 208.

FIG. 5 illustrates an example embodiment of a Fourier-based mapping for converting segmented-image data to a derivative of Radon space.

The flow begins in block B500, where a console obtains a group of segmented-image data 203 and maps the group of segmented-image data 203 to Fourier space, thereby generating a Fourier cube 302. For example, the console may use a fast Fourier transform (FFT), such as a three-dimensional non-uniform fast Fourier transform (3D NUFFT), to map the group of segmented-image data 203 to Fourier space.

The flow then moves to block B510, where, in accordance with the Fourier-slice theorem (projection-slice theorem), the console generates Fourier slices 303 along the radial direction based on the Fourier cube 302.

The flow then proceeds to block B520, where the console scales the Fourier slices 303, thereby generating scaled Fourier slices 304. For example, the console may generate the scaled Fourier slices 304 by scaling the Fourier slices 303 using $j2\pi R$.

Then, in block B530, the console generates a group of Radon-space data 204 by performing inverse FFTs on the scaled Fourier slices 304. The Radon-space data 204 is defined in a three-dimensional derivative of Radon space.

Accordingly, the operations in FIG. 5 convert the group of segmented-image data 203 to the derivative of Radon space, and the group of Radon-space data 204 constitutes the segmented-image data 203 that have been converted to the derivative of Radon space. Also, the group of Radon-space data 204 has a radial sampling pattern.

Figure 6:
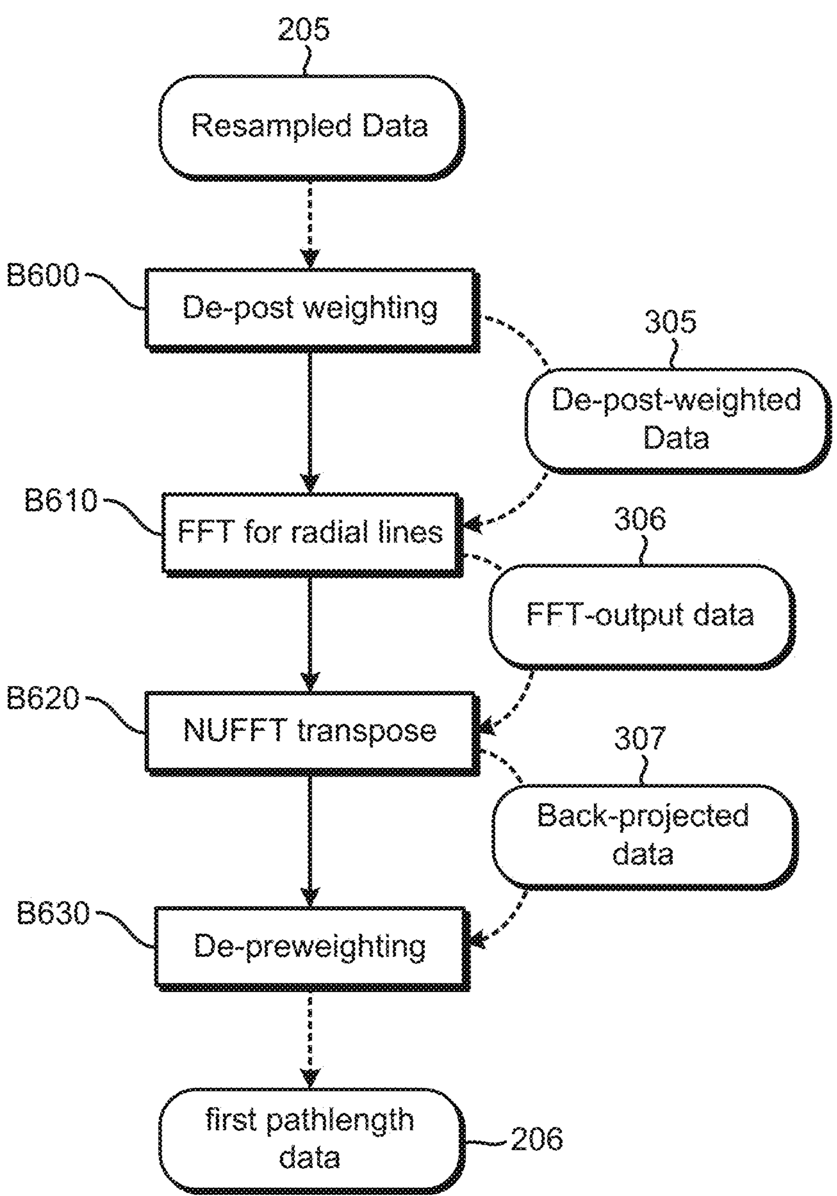
FIG. 6 illustrates an example embodiment of a method for generating pathlength data from Radon-space data.
Figure 7:
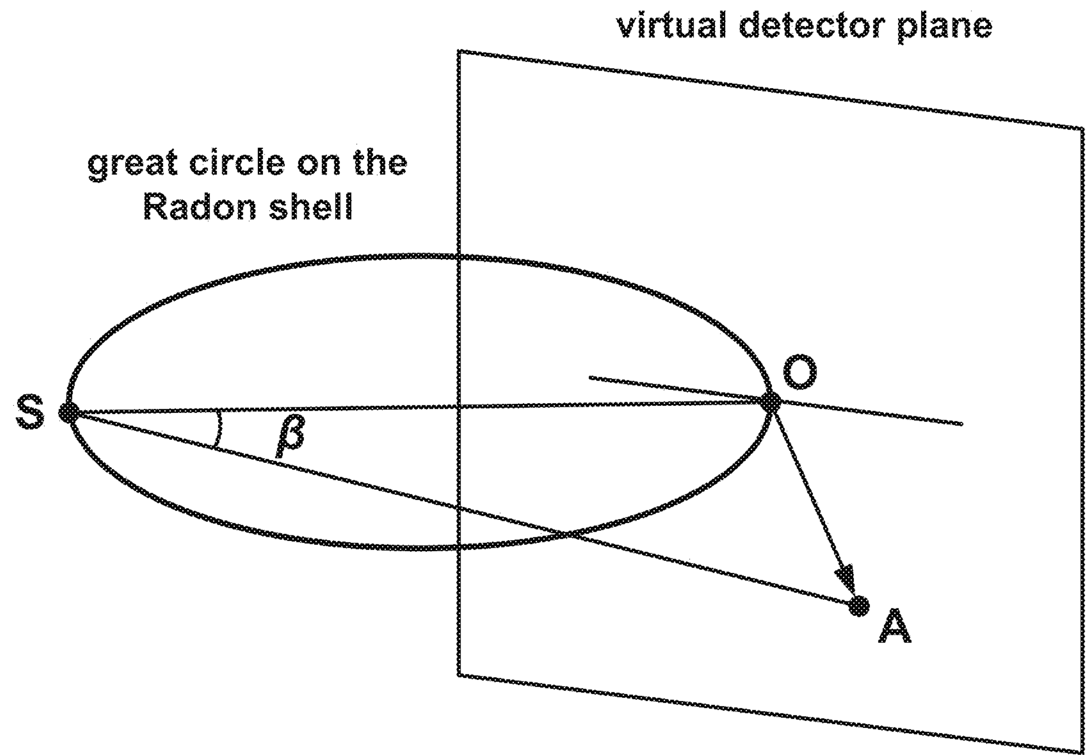
FIG. 7 schematically illustrates Grangeat's cone-beam geometry.

FIG. 6 illustrates an example embodiment of a method for generating pathlength data from Radon-space data. First, in block B600, a console obtains a group of resampled data 205 and de-post weights the resampled data 205, thereby generating de-post-weighted data 305. To perform de-post-weighting of the group of resampled data 205, the console uses $(\cos\beta)^2/\overline{SO}$. As indicated by FIG. 7, which schematically illustrates Grangeat's cone-beam geometry, S is an X-ray source, O is the center of the virtual detector plane, and A is a pixel of the X-ray detector (and the line OA lies in the virtual detector plane).

Next, in block B610, the console performs a one-dimensional FFT for each radial line in the de-post-weighted data 305. The output of block B610 is FFT-output data 306. The flow then proceeds to block B620, where the console uses an NUFFT transpose (NUFFT adjoint) for two-dimensional back projection of the FFT-output data 306. The output of block B620 is back-projected data 307. Because the Radon data is derivative, a ramp filter is not necessary.

The flow then proceeds to block B630, where the console de-preweights the back-projected data 307, thereby generating a group of first pathlength data 206 (which may be in the form of a sinogram).

Figure 8:
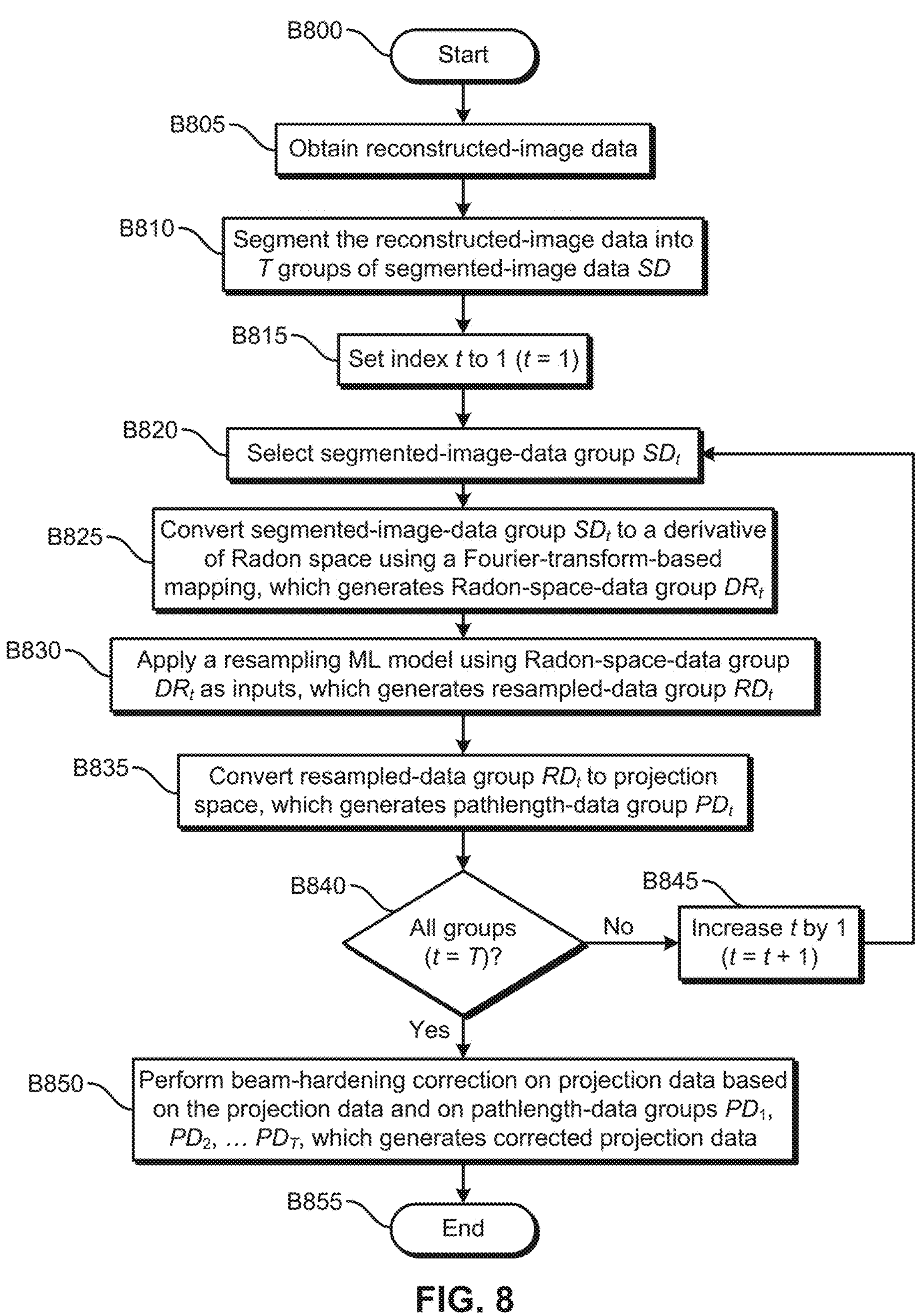
FIG. 8 illustrates an example embodiment of a method for generating corrected projection data.

FIG. 8 illustrates an example embodiment of a method for generating corrected projection data. The flow begins in block B800 and moves to block B805, where a console obtains reconstructed-image data (reconstructed-image data 202), for example by generating the reconstructed-image data from cone-beam projection data 201 or by acquiring the reconstructed-image data from another device.

Next, in block B810, the console segments the reconstructed-image data into T segmented-image-data groups SD (which are groups of segmented-image data 203), where $T \geq 2$. Each segmented-image-data group SD corresponds to a respective material (e.g., bone, water, soft tissue, contrast agent) and includes the voxels that have data values that correspond to the respective material (and omits all or nearly all of the other voxels). Also, each segmented-image-data group SD may define a respective material-component image.

The flow then moves to block B815, where the console sets an index t to 1. Then, in block B820, the console selects segmented-image-data group $SD_t$.

The flow then advances to block B825, where the console converts segmented-image-data group $SD_t$ to a derivative of Radon space using a Fourier-transform-based mapping. The output of the conversion is Radon-space-data group $DR_t$ (a group of Radon-space data 204), which has a radial sampling pattern. For example, the conversion in block B825 may be performed according to FIG. 5.

The flow proceeds to block B830, where the console applies a resampling ML model (resampling ML model 252) using Radon-space-data group $DR_t$ as inputs, and the output of the resampling ML model is resampled-data group $RD_t$ (a group of resampled data 205), which has a CBPG-shaped sampling pattern.

Next, in block B835, the console converts resampled-data group $RD_t$ to projection space, for example according to a reverse Grangeat method. The output of the conversion is pathlength-data group $PD_t$ (a group of first pathlength data 206). For example, the conversion in block B835 may be performed according to the method in FIG. 6. Pathlength-data group $PD_t$ may define a sinogram that corresponds to segmented-image-data group $SD_t$.

The flow then moves to block B840, where the console determines whether a respective pathlength-data group PD has been generated for each of the segmented-image-data groups SD (whether $t=T$). If the console determines that a respective pathlength-data group PD has not been generated for each of the segmented-image-data groups SD (if $t<T$), then the flow moves to block B845. In block B845, the console increases the index t by 1 ($t=t+1$), and then the flow returns to block B820.

If the console determines that a respective pathlength-data group PD has been generated for each of the segmented-image-data groups SD (if $t=T$), then the flow moves to block B850.

In block B850, the console performs beam-hardening correction on projection data (the projection data 201 from which the reconstructed-image data were generated) based on the projection data and on the pathlength-data groups PD. Also, the console may use one or more BHC models (e.g., tables) to perform the beam-hardening correction. The output of the beam-hardening correction is corrected projection data (corrected projection data 208).

The console may store or output the corrected projection data. Also, the console may perform a reconstruction process on the corrected projection data, which generates reconstructed-image data (corrected reconstructed-image data 209), and store or output the reconstructed-image data. And the console may control the display of one or more images based on the reconstructed-image data.

Finally, the flow ends in block B855.

Figure 9:
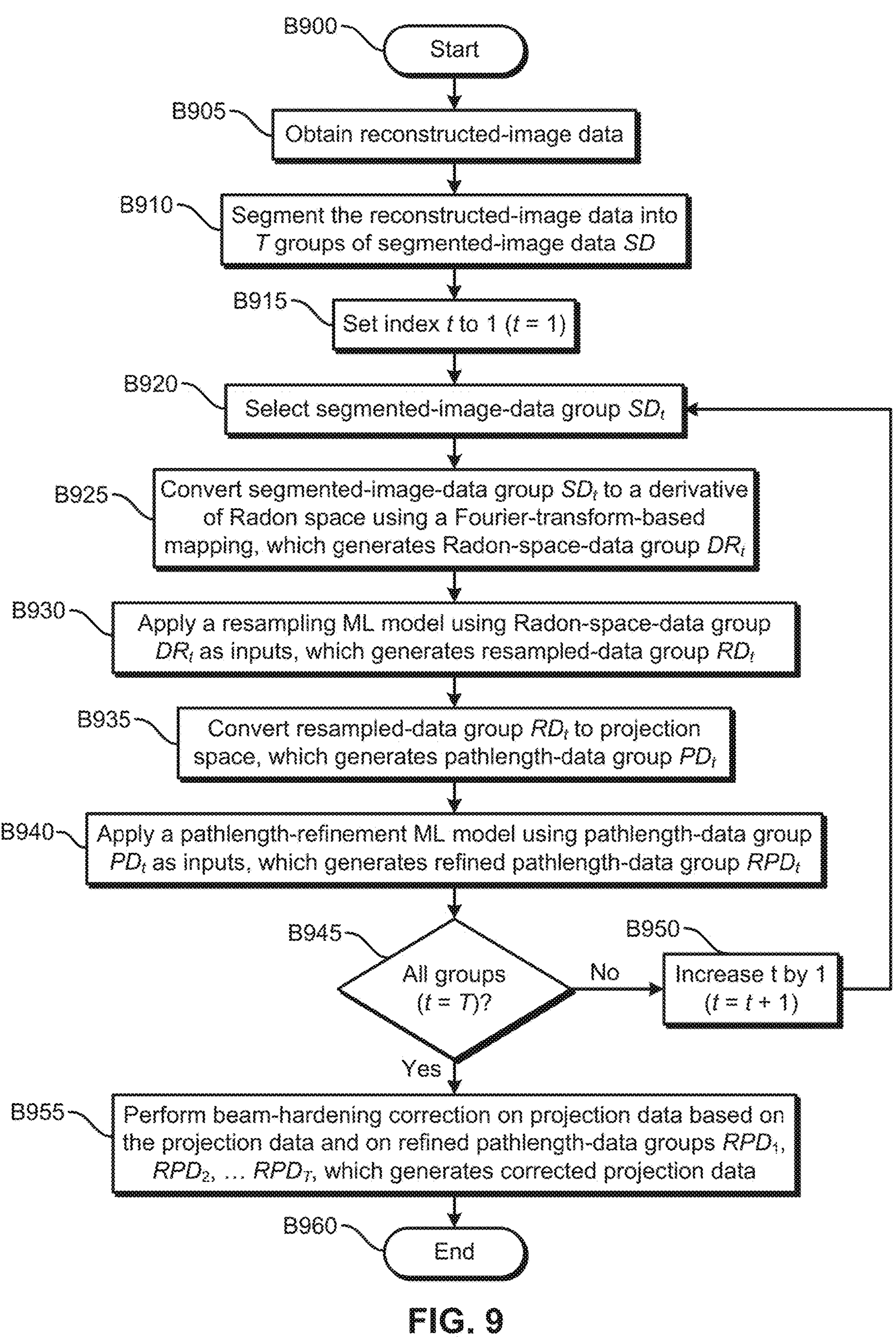
FIG. 9 illustrates an example embodiment of a method for generating corrected projection data.

FIG. 9 illustrates an example embodiment of a method for generating corrected projection data. The flow begins in block B900 and moves to block B905, where a console obtains reconstructed-image data (reconstructed-image data 202), for example by generating the reconstructed-image data from cone-beam projection data 201 or by acquiring the reconstructed-image data from another device.

Next, in block B910, the console segments the reconstructed-image data into T segmented-image-data groups SD (which are groups of segmented-image data 203), where $T \geq 2$. Each segmented-image-data group SD corresponds to a respective material (e.g., bone, water) and includes the voxels that have data values that correspond to the respective material (and omits all or nearly all of the other voxels).

The flow then moves to block B915, where the console sets an index t to 1. Then, in block B920, the console selects segmented-image-data group $SD_t$.

The flow then advances to block B925, where the console converts segmented-image-data group $SD_t$ to a derivative of Radon space using a Fourier-transform-based mapping. The output of the conversion is a Radon-space-data group $DR_t$ (a group of Radon-space data 204), which has a radial sampling pattern. For example, the conversion in block B925 may be performed according to the method in FIG. 5.

The flow proceeds to block B930, where the console applies a resampling ML model (resampling ML model 252) using Radon-space-data group $DR_t$ as inputs, and the output of the resampling ML model is resampled-data group $RD_t$ (a group of resampled data 205), which has a CBPG-shaped sampling pattern.

Next, in block B935, the console converts resampled-data group $RD_t$ to projection space, for example according to a reverse Grangeat method. The output of the conversion is pathlength-data group $PD_t$ (a group of first pathlength data 206). For example, the conversion in block B935 may be performed according to the method in FIG. 6. Pathlength-data group $PD_t$ may define a sinogram that corresponds to segmented-image-data group $SD_t$.

Then, in block B940, the console applies a pathlength-refinement ML model (pathlength-refinement ML model 256) using pathlength-data group $PD_t$ as inputs, and the output of the pathlength-refinement ML model is refined-pathlength-data group $RPD_t$ (a group of second pathlength data 207).

The flow then moves to block B945, where the console determines whether a respective refined-pathlength-data group RPD has been generated for each of the segmented-image-data groups SD (whether t=T). If the console determines that a respective refined-pathlength-data group RPD has not been generated for each of the segmented-image-data groups SD (if t<T), then the flow moves to block B950. In block B950, the console increases t by 1 (t=t+1), and then the flow returns to block B920.

If the console determines that a respective refined-pathlength-data group RPD has been generated for each of the segmented-image-data groups SD (if t=T), then the flow moves to block B955.

In block B955, the console performs beam-hardening correction on projection data (the projection data 201 from which the reconstructed-image data were generated) based on the projection data and on the refined-pathlength-data groups RPD. Also, the console may use one or more BHC models (e.g., tables) to perform the beam-hardening correction. The output of the beam-hardening correction is corrected projection data (corrected projection data 208).

The console may store or output the corrected projection data. Also, the console may perform a reconstruction process on the corrected projection data, which generates reconstructed-image data (corrected reconstructed-image data 209), and may store or output the reconstructed-image data. And the console may control the display of one or more images based on the reconstructed-image data.

Finally, the flow ends in block B960.

Figure 10:
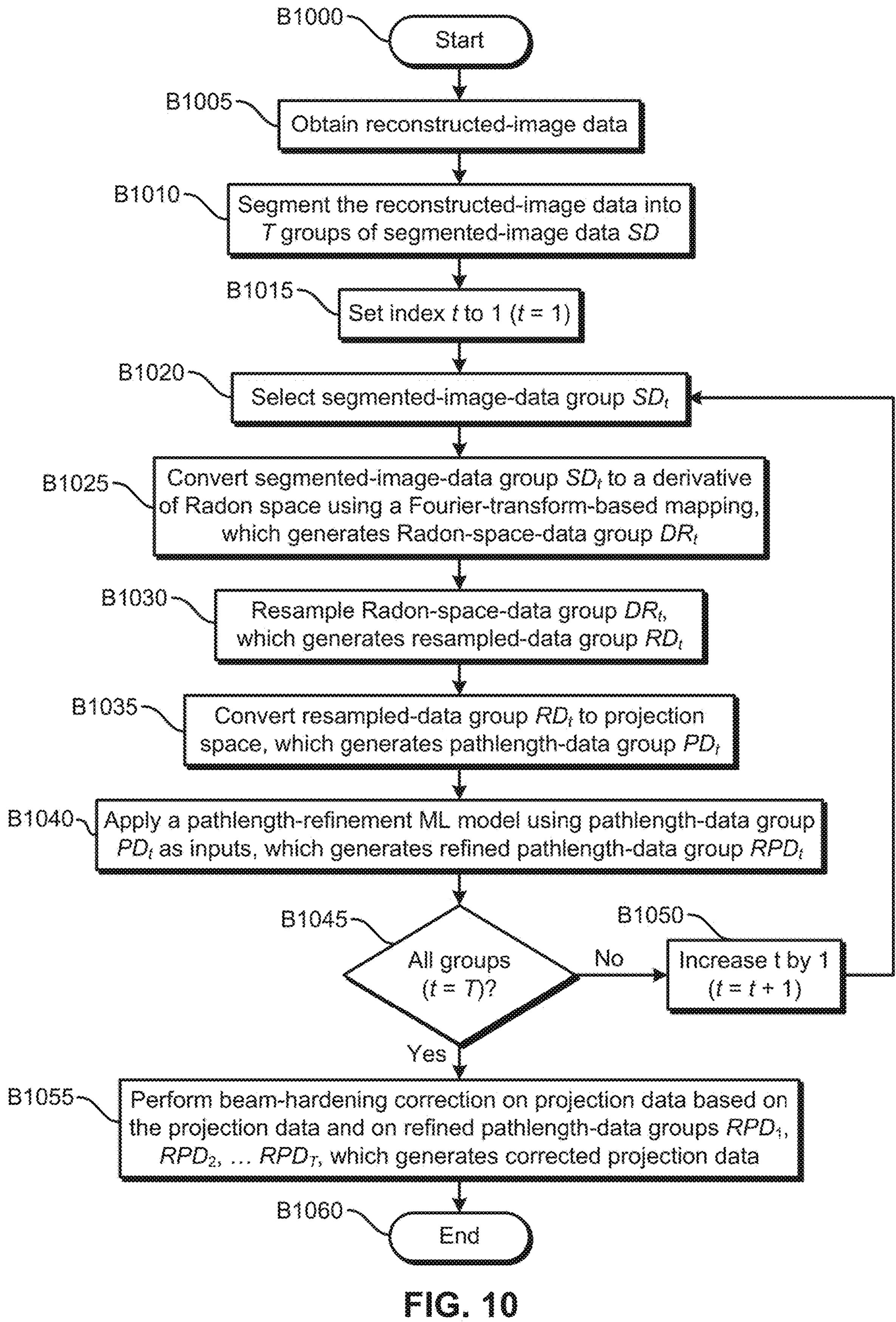
FIG. 10 illustrates an example embodiment of a method for generating corrected projection data.

FIG. 10 illustrates an example embodiment of a method for generating corrected projection data. The flow begins in block B1000 and moves to block B1005, where a console obtains reconstructed-image data (reconstructed-image data 202), for example by generating the reconstructed-image data from cone-beam projection data 201 or by acquiring the reconstructed-image data from another device.

Next, in block B1010, the console segments the reconstructed-image data into T segmented-image-data groups SD (which are groups of segmented-image data 203), where T≥2. Each segmented-image-data group SD corresponds to a respective material (e.g., bone, water) and includes the voxels that have data values that correspond to the respective material (and omits all or nearly all of the other voxels).

The flow then moves to block B1015, where the console sets an index t to 1. Then, in block B1020, the console selects segmented-image-data group $SD_t$.

The flow then advances to block B1025, where the console converts segmented-image-data group $SD_t$ to a derivative of Radon space using a Fourier-transform-based mapping. The output of the conversion is a Radon-space-data group $DR_t$ (a group of Radon-space data 204), which has a radial sampling pattern. For example, the conversion in block B1025 may be performed according to the method in FIG. 5.

The flow proceeds to block B1030, where the console resamples Radon-space-data group $DR_t$, and the output of the resampling is resampled-data group $RD_t$ (a group of resampled data 205), which has a CBPG-shaped sampling pattern. For example, the resampling may use linear interpolation from nearest points or may use non-uniform fast-Fourier-transform-based resampling.

Next, in block B1035, the console converts resampled-data group $RD_t$ to projection space, for example according to a reverse Grangeat method. The output of the conversion is pathlength-data group $PD_t$ (a group of first pathlength data 206). For example, the conversion in block B1035 may be performed according to the method in FIG. 6. Pathlength-data group $PD_t$ may define a sinogram that corresponds to segmented-image-data group $SD_t$.

Then, in block B1040, the console applies a pathlength-refinement ML model (pathlength-refinement ML model 256) using pathlength-data group $PD_t$ as inputs, and the output of the pathlength-refinement ML model is refined-pathlength-data group $RPD_t$ (a group of second pathlength data 207).

The flow then moves to block B1045, where the console determines whether a respective refined-pathlength-data group RPD has been generated for each of the segmented-image-data groups SD (whether t=T). If the console determines that a respective refined-pathlength-data group RPD has not been generated for each of the segmented-image-data groups SD (if t<T), then the flow moves to block B1050. In block B1050, the console increases t by 1 (t=t+1), and then the flow returns to block B1020.

If the console determines that a respective refined-pathlength-data group RPD has been generated for each of the segmented-image-data groups SD (if t=T), then the flow moves to block B1055.

In block B1055, the console performs beam-hardening correction on projection data (the projection data 201 from which the reconstructed-image data were generated) based on the projection data and on the refined-pathlength-data groups RPD. Also, the console may use one or more BHC models (e.g., tables) to perform the beam-hardening correction. The output of the beam-hardening correction is corrected projection data (corrected projection data 208).

The console may store or output the corrected projection data. Also, the console may perform a reconstruction process on the corrected projection data, which generates reconstructed-image data (corrected reconstructed-image data 209), and may store or output the reconstructed-image data.

And the console may control the display of one or more images based on the reconstructed-image data.

Finally, the flow ends in block B1060.

Figure 11:
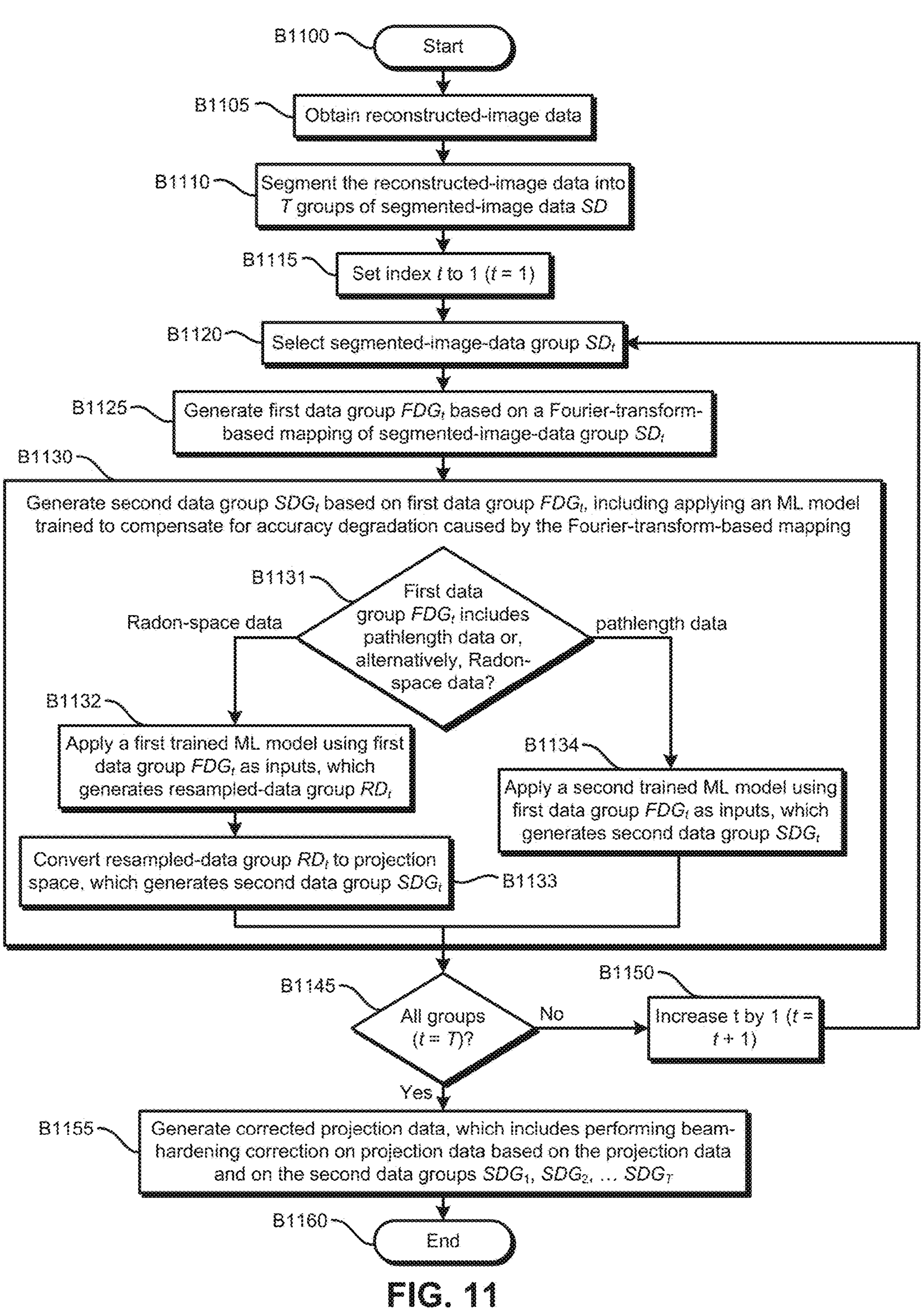
FIG. 11 illustrates an example embodiment of a method for generating corrected projection data.

FIG. 11 illustrates an example embodiment of a method for generating corrected projection data. The flow begins in block B1100 and moves to block B1105, where a console obtains reconstructed-image data (reconstructed-image data 202), for example by generating the reconstructed-image data from cone-beam projection data 201 or by acquiring the reconstructed-image data from another device.

Next, in block B1110, the console segments the reconstructed-image data into T segmented-image-data groups SD (which are groups of segmented-image data 203), where T≥2. Each segmented-image-data group SD corresponds to a respective material (e.g., bone, water) and includes the voxels that have data values that correspond to the respective material (and omits all or nearly all of the other voxels).

The flow then moves to block B1115, where the console sets an index t to 1. Then, in block B1120, the console selects segmented-image-data group $SD_t$.

The flow then advances to block B1125, where the console generates first data group $FDG_t$ based on a Fourier-transform-based mapping of segmented-image-data group $SD_t$. For example, first data group $FDG_t$ may be generated according to blocks B500-B530 in FIG. 5, according to blocks B500-B530 in FIG. 5 and blocks B600-B630 in FIG. 6, according to block B825 in FIG. 8, according to block B925 in FIG. 9, or according to blocks B1025-B1035 in FIG. 10. Thus, first data group $FDG_t$ may include Radon-space data or, alternatively, pathlength data.

The flow proceeds to block B1130, where the console generates second data group $SDG_t$ based on first data group $FDG_t$. In block B1130, the console applies an ML model that is trained to compensate for accuracy degradation cause by the Fourier-transform-based mapping in block B1125. And second data group $SDG_t$ includes data that are defined in projection space and that correspond to segmented-image-data group $SD_t$. Second data group $SDG_t$ indicates the results of mapping segmented-image-data group $SD_t$ to projection space, and second data group SDG may define a sinogram that corresponds to segmented-image-data group $SD_t$.

In this embodiment, block B1130 includes blocks B1131-B1134. In block B1131, the console determines whether first data group $FDG_t$ includes pathlength data or, alternatively, Radon-space data. If the console determines that first data group $FDG_t$ includes Radon-space data, then the flow moves to block B1132. If the console determines that first data group $FDG_t$ includes pathlength data, then the flow moves to block B1134.

In block B1132, the console applies a first trained ML model (a resampling ML model 252) using first data group $FDG_t$ as inputs, and the output of the first trained ML model is resampled-data group $RD_t$ (a group of resampled data 205), which has a CBPG-shaped sampling pattern.

Next, in block B1133, the console converts resampled-data group $RD_t$ to projection space, for example according to a reverse Grangeat method, which generates second data group $SDG_t$, which includes pathlength data that correspond to segmented-image-data group $SD_t$. For example, the conversion in block B1133 may be performed according to a reverse Grangeat method (such as the method in FIG. 6). From block B1133, the flow moves to block B1145.

In block B1134, the console applies a second trained ML model (a pathlength-refinement ML model 256) using first data group $FDG_t$ as inputs, and the output of the second trained ML model is second data group $SDG_t$, which include pathlength data that correspond to segmented-image-data group $SD_t$. From block B1134, the flow moves to block B1145.

In block B1145, the console determines whether a respective second data group SDG has been generated for each of the segmented-image-data groups SD (whether t=T). If the console determines that a respective second data group SDG has not been generated for each of the segmented-image-data groups SD (if t<T), then the flow moves to block B1150. In block B1150, the console increases t by 1 (t=t+1), and then the flow returns to block B1120.

If the console determines that a second data group SDG has been generated for each of the segmented-image-data groups SD (if t=T), then the flow moves to block B1155.

In block B1155, the console performs beam-hardening correction on projection data (the projection data 201 from which the reconstructed-image data were generated) based on the projection data and on the second data groups SDG. Also, the console may use one or more BHC models (e.g., tables) to perform the beam-hardening correction. The output of the beam-hardening correction is corrected projection data (corrected projection data 208).

The console may store or output the corrected projection data. Also, the console may perform a reconstruction process on the corrected projection data, which generates reconstructed-image data (corrected reconstructed-image data 209), and may store or output the reconstructed-image data. And the console may control the display of one or more images based on the reconstructed-image data.

Finally, the flow ends in block B1160.

Figure 12:
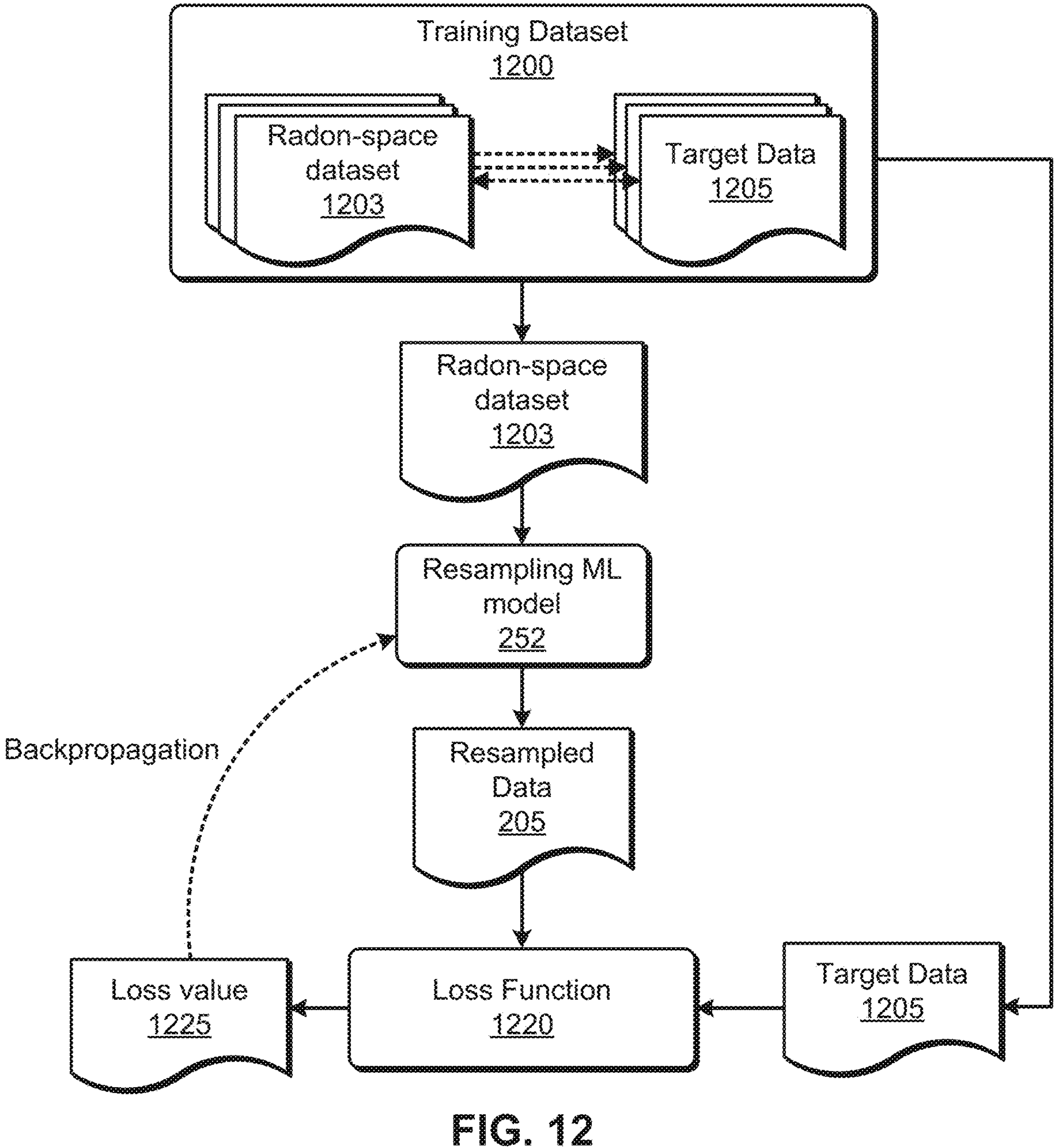
FIG. 12 illustrates the flow of information in an example embodiment of a method for training a resampling machine-learning (ML) model.

FIG. 12 illustrates the flow of information in an example embodiment of a method for training a resampling ML model. In FIG. 12, a training dataset 1200 includes a plurality of Radon-space datasets 1203 and corresponding target data 1205.

Each Radon-space dataset 1203 includes a group of Radon-space data and may be generated from respective image data (e.g., segmented-image data), for example as described in FIG. 5. Also, each Radon-space dataset 1203 has corresponding target data 1205. The corresponding target data 1205 of a Radon-space dataset 1203 may be generated from the same image data (e.g., segmented-image data) from which the Radon-space dataset 1203 was generated. The corresponding target data 1205 may be generated by using ray tracing forward projection to map the image data to projection space, which generates corresponding projection data, and then convert the projection data from projection space to the derivative of Radon space using a Grangeat method, which generates corresponding data in the derivative of the Radon space that have a CBPG-shaped sampling pattern. Thus, the corresponding target data 1205 and the Radon-space dataset 1203 are generated from the same image data (e.g., segmented-image data), but the data in the corresponding target data 1205 have a CBPG-shaped sampling pattern and the data in the Radon-space dataset 1203 have a radial sampling pattern.

A large training dataset 1200, which includes a plurality of Radon-space datasets 1203 and corresponding target data 1205, can be used to account for various conditions (e.g., device parameters, such as scanning kVp and dosage; object shapes; materials). For example, in some embodiments, the training dataset 1200 includes a plurality of Radon-space datasets 1203 that were derived from projection data of phantoms and a plurality of Radon-space datasets 1203 that were derived from projection data of patients. Each phantom can be selected according to a pre-determined human anatomy through modulation of the shape, size, and material each phantom is constructed from. In addition, and in consideration of a representative population of patients, the plurality of Radon-space datasets 1203 that were derived from projection data of patients can be selected to include patients of simple and complex anatomies, the data including typical patient data with variations including, among others, patient shape, patient anatomy, organ distribution, size, metal inclusion, and contrast. Also, the patient projection datasets 1203 can be selected to include variations in the scanning kVp and dosage.

The resampling ML model 252 accepts, as inputs, a Radon-space dataset 1203. Based on the inputs, the resampling ML model 252 outputs respective resampled data 205, which have a CBPG-shaped sampling pattern.

The resampled data 205 and corresponding target data 1205 (which corresponds to the Radon-space dataset 1203 that was used as the basis of the generation of the resampled data 205) are input into one or more loss functions 1220. The one or more loss functions 1220 output one or more loss values 1225, which are gradients in this embodiment, based on the resampled data 205 and on the target data 1205.

The one or more loss values 1225 (e.g., gradients) are backpropagated through the resampling ML model 252. For example, the backpropagation may use one or more of the following: a steepest descent method (e.g., with variable learning rate, with variable learning rate and momentum, and resilient backpropagation), a quasi-Newton method (e.g., Broyden-Fletcher-Goldfarb-Shanno, one step secant, and Levenberg-Marquardt), or a conjugate gradient method (e.g., Fletcher-Reeves update, Polak-Ribiere update, Powell-Beale restart, and scaled conjugate gradient). And the optimization method by which the backpropagation is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, for example, a Nesterov momentum technique or an adaptive method, such as an Adagrad sub-gradient method, an Adadelta or RMSProp parameter update variation of the Adagrad method, and an Adam adaptive optimization technique. The optimization method can also apply a second-order method by incorporating the Jacobian matrix into an update step.

After the backpropagation is finished, the training method in FIG. 12 can be repeated. The training method can be repeated until predefined stopping criteria, which are used to determine whether the training of the resampling ML model 252 is complete, are satisfied. For example, the predefined stopping criteria can evaluate whether the new error (loss value 1225) or the total number of iterations performed equal or exceed predefined values. For example, the stopping criteria can be satisfied if either the new error falls below a predefined threshold or if a maximum number of iterations is reached.

Figure 13:
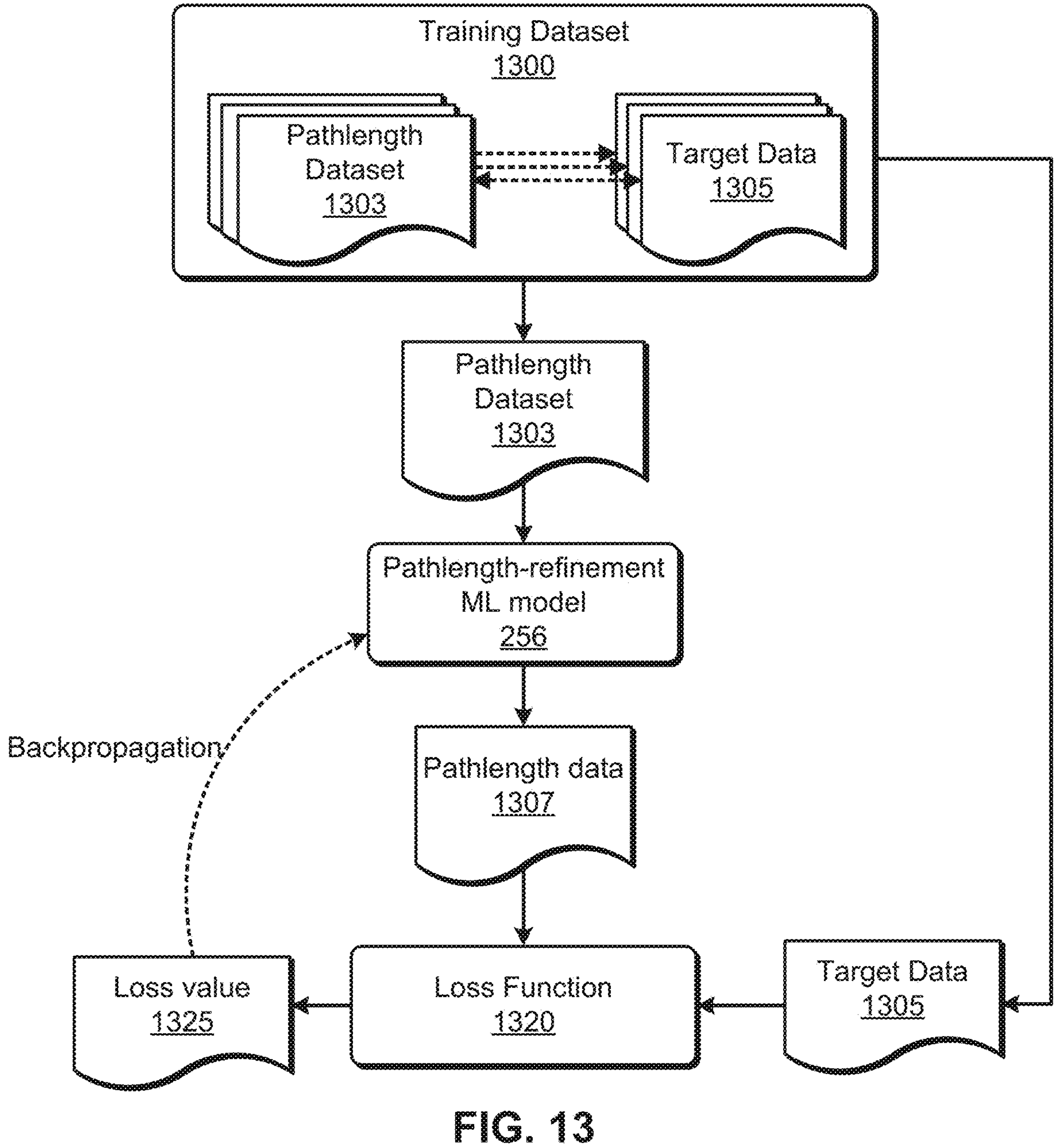
FIG. 13 illustrates the flow of information in an example embodiment of a method for training a pathlength-refinement ML model.

FIG. 13 illustrates the flow of information in an example embodiment of a method for training a pathlength-refinement ML model. In FIG. 13, a training dataset 1300 includes a plurality of pathlength datasets 1303 and corresponding target data 1305.

Each pathlength dataset 1303 includes a respective group of pathlength data (e.g., first pathlength data 207) that may be generated from a respective group of resampled data 205 using a reverse Grangeat method (e.g., as described in FIG. 6), and each group of resampled data 205 was generated from a respective corresponding group of image data (e.g., group of segmented-image data). Also, each pathlength dataset 1303 has respective corresponding target data 1305. The respective corresponding target data 1305 of a pathlength dataset 1303 is generated from the corresponding group of image data (e.g., group of segmented-image data) from which the respective group of resampled data 205 and the pathlength dataset 1303 were generated. The corresponding target data 1305 may be generated by using a pathlength-estimation process to generate the target data 1305 from the corresponding group of image data (e.g., segmented-image data) from which the respective group of resampled data 205 and the pathlength dataset 1303 were generated. The pathlength-estimation process may use forward projection and may use ray tracing (e.g., forward projection with ray tracing). Thus, the corresponding target data 1305 and the pathlength dataset 1303 are generated from the same group of image data (e.g., segmented-image data), although they are generated using different methods.

Like the training dataset 1200 in FIG. 12, a large training dataset 1300, which includes a plurality of pathlength datasets 1303 and corresponding target data 1305, can be used to account for various conditions (e.g., device parameters, such as scanning kVp and dosage; object shapes; materials).

The pathlength-refinement ML model 256 accepts, as inputs, a pathlength dataset 1303. Based on the inputs, the pathlength-refinement ML model 256 outputs respective pathlength data 1307.

The pathlength data 1307 and corresponding target data 1305 (which correspond to the pathlength dataset 1303 that was used as the basis of the generation of the pathlength data 1307) are input into one or more loss functions 1320. The one or more loss functions 1320 output one or more loss values 1325, which are gradients in this embodiment, based on the pathlength data 1307 and on the target data 1305.

The one or more loss values 1325 (e.g., gradients) are backpropagated through the pathlength-refinement ML model 256. The backpropagation may use the same techniques that are described above in the description of backpropagation in FIG. 12. After the backpropagation is finished, the training process in FIG. 13 can be repeated. The training process can be repeated until predefined stopping criteria, which are used to determine whether the training of the pathlength-refinement ML model 256 is complete, are satisfied. For example, the predefined stopping criteria can evaluate whether the new error (loss value 1325) or the total number of iterations performed exceed predefined values. For example, the stopping criteria can be satisfied if either the new error falls below a predefined threshold or if a maximum number of iterations is reached.

Figure 14:
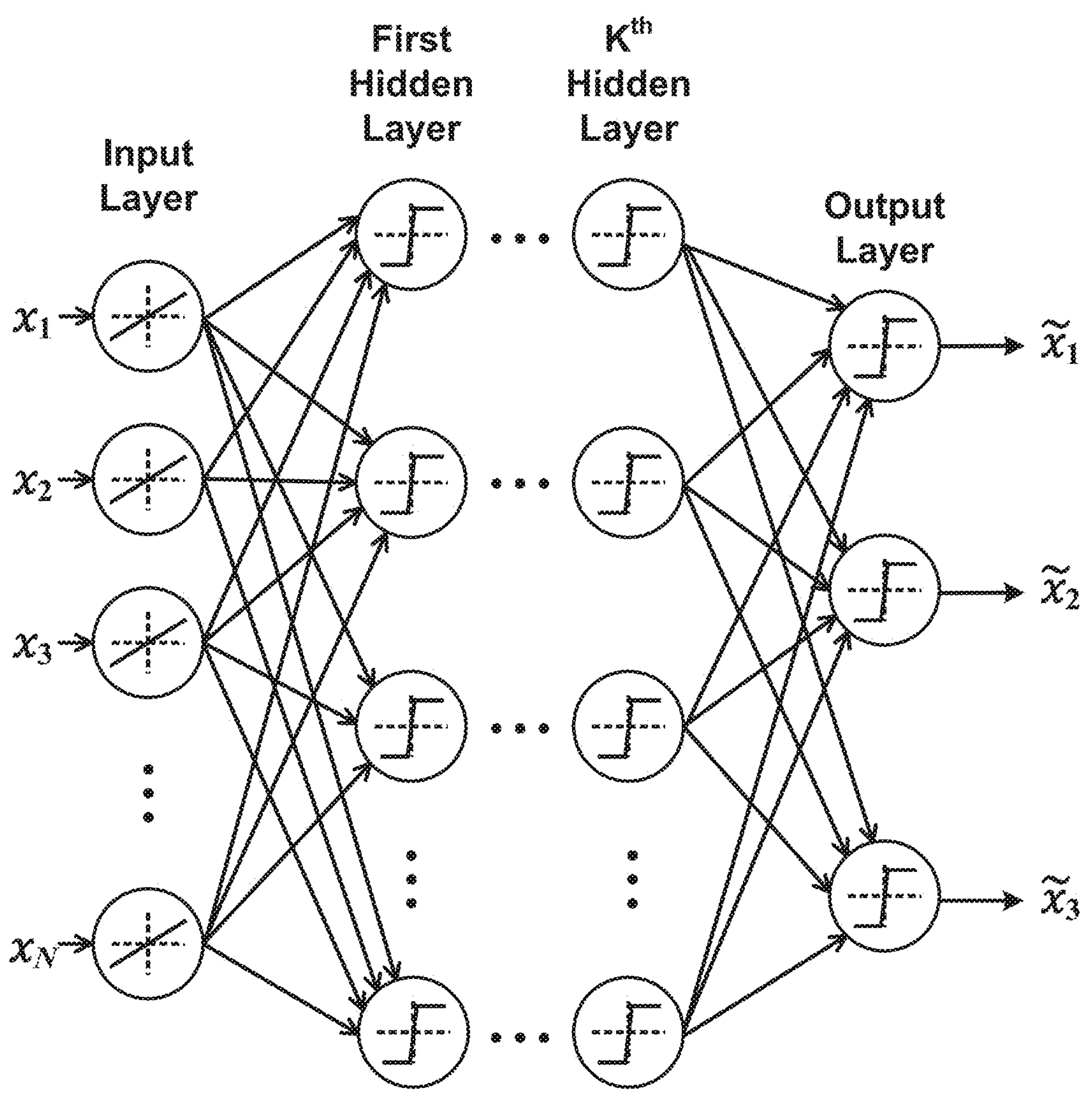
FIG. 14 illustrates an example embodiment of a neural network.

FIG. 14 illustrates an example embodiment of a neural network (which may be a trained resampling ML model 252 or a trained pathlength-refinement ML model 256). The neural network is an artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture, such as the number of nodes or their connectivity. The nodes in an ANN can be referred to as neurons (or as neuronal nodes), and the neurons can have inter-connections between the different layers of the ANN system. The simplest ANN has three layers, and is called an autoencoder. The neural network may have more than three layers of neurons, and may have as many output neurons $\tilde{x}_N$ as input neurons. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) can be described as a composition of other functions $n_i(x)$, which can further be described as a composition of other functions. This can be conveniently represented as a network structure, with arrows depicting the dependencies between variables, as shown in FIG. 14. For example, the ANN can use a nonlinear weighted sum, such as $m(x)=K(\Sigma_i w_i n_i(x))$, where K (commonly referred to as the activation function) is some predefined function (e.g., a hyperbolic tangent), and where $w_i$ is the weight of corresponding function $n_i(x)$.

In FIG. 14 (and similarly in FIG. 15), the neurons (i.e., nodes) are depicted by circles around a threshold function. For the non-limiting example shown in FIG. 14, the inputs are depicted as circles around a linear function, and the arrows indicate directed connections between neurons. In certain implementations, the neural network is a feedforward network as exemplified in FIGS. 14 and 15 (e.g., it can be represented as a directed acyclic graph).

The neural network operates to achieve a specific task, such as resampling data or refining a pathlength, by searching within the class of functions F to learn, using a set of observations, to find $m^* \in F$, which solves the specific task in some optimal sense (e.g., the stopping criteria discussed above). For example, in certain implementations, this can be achieved by defining a cost function $C: F \rightarrow \mathbb{R}$ such that, for the optimal solution m*, $C(m^*) \le C(m) \forall m \in F$ (i.e., no solution has a cost less than the cost of the optimal solution). The cost function is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

Figure 15:
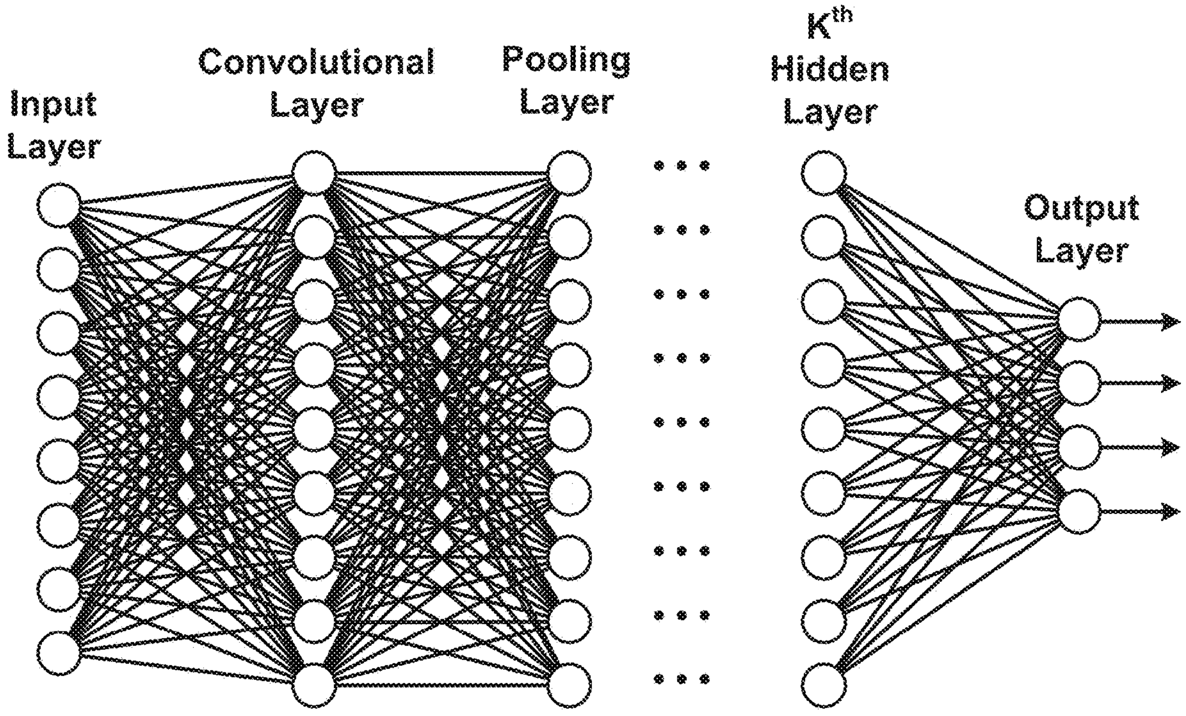
FIG. 15 illustrates an example embodiment of a convolutional neural network (CNN).

In some embodiments, the neural network is a convolutional neural network (CNN), and FIG. 15 illustrates an example embodiment of a CNN. CNNs use feed-forward ANNs in which the connectivity pattern between neurons can represent convolutions. For example, CNNs can be used for image-processing optimization by using multiple layers of small neuron collections that process portions of the input data (e.g., projection data), called receptive fields. The outputs of these collections can then be tiled so that they overlap. This processing pattern can be repeated over multiple layers having alternating convolution and pooling layers.

Figure 16:
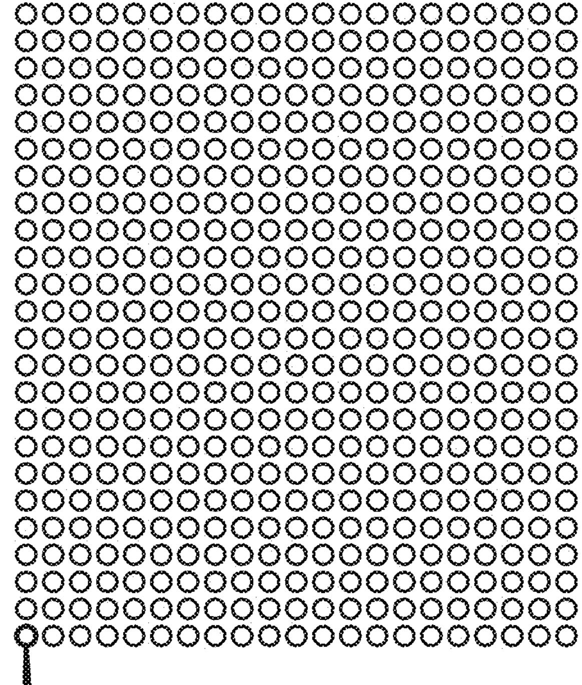
FIG. 16 illustrates an example of implementing a convolution layer for one neuronal node of the convolution layer, according to an example embodiment.
Figure 16:
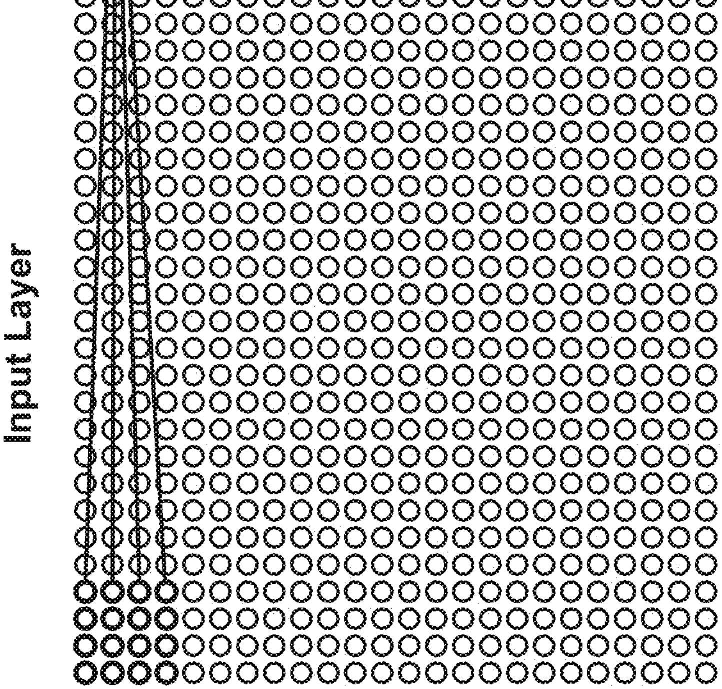

FIG. 16 illustrates an example of implementing a convolution layer for one neuronal node of the convolution layer, according to an example embodiment. FIG. 16 shows an example of a 4×4 kernel being applied to map values from an input layer representing a two-dimensional image (e.g., a sinogram) to a first hidden layer, which is a convolution layer. The kernel maps respective 4×4 pixel regions to corresponding neurons of the first hidden layer.

Following a convolution layer, a CNN can include local or global pooling layers, which combine the outputs of neuron clusters in the convolution layers. Additionally, in certain implementations, the CNN can also include various combinations of convolution and fully-connected layers, with pointwise nonlinearity applied at the end of or after each layer.

Figure 17:
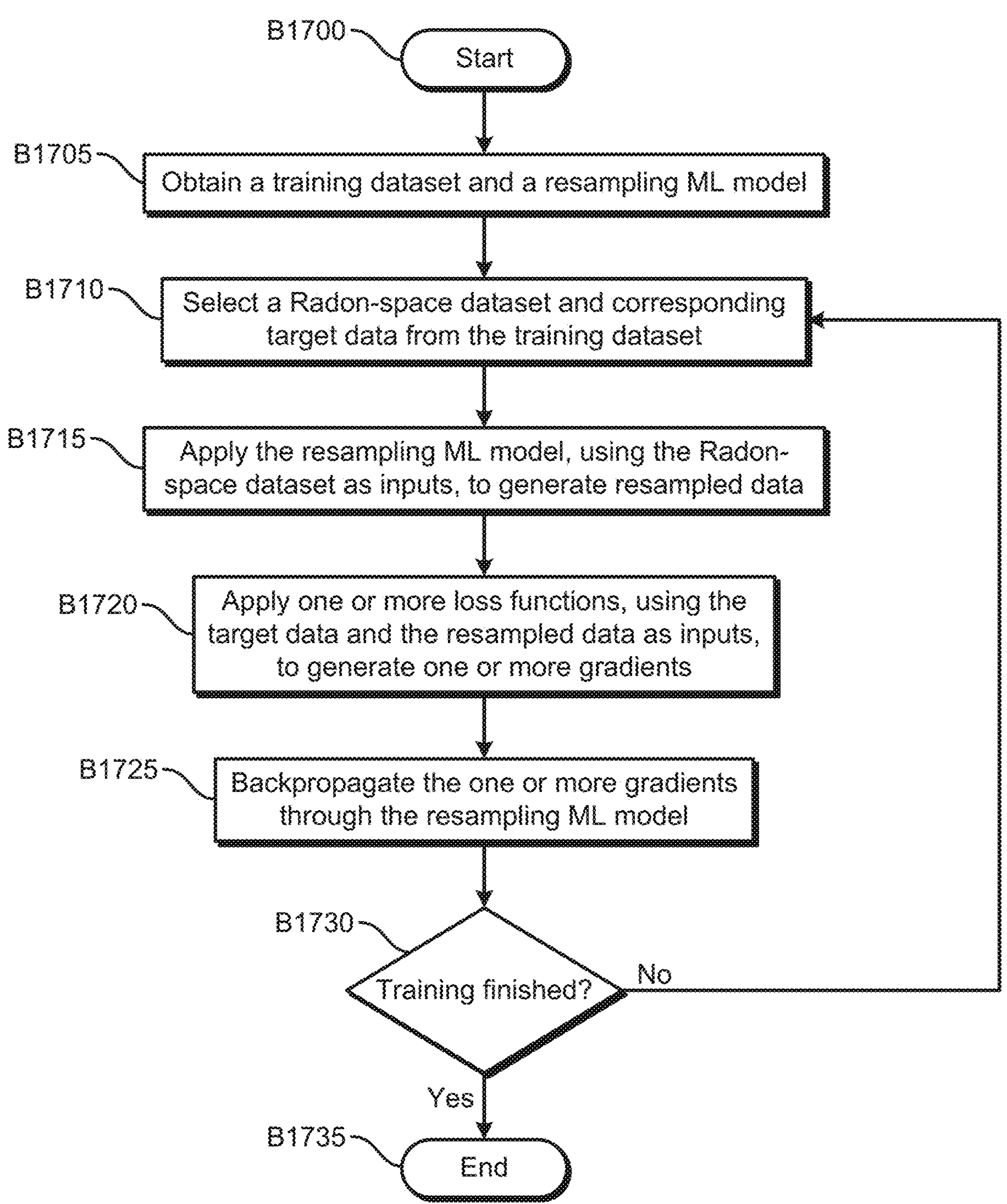
FIG. 17 illustrates an example embodiment of a method for training a resampling ML model.

FIG. 17 illustrates an example embodiment of a method for training a resampling ML model. Furthermore, although this operational flow is performed by a neural-network-training device, some embodiments of this operational flow are performed by two or more neural-network-training devices or by one or more other specially-configured computing devices.

The flow begins in block B1700 and then moves to block B1705, where a neural-network-training device obtains (e.g., retrieves from storage, receives from another device) a training dataset 1200 and a resampling ML model 252. Next, in block B1710, the neural-network-training device selects a Radon-space dataset 1203 and target data 1205 from the training dataset 1200. The Radon-space dataset 1203 and the target data 1205 correspond to each other.

The flow then advances to block B1715, where the neural-network-training device applies the resampling ML model 252, using the Radon-space dataset 1203 as inputs, to generate resampled data 205. The flow then moves to block B1720, where the neural-network-training device applies one or more loss functions, using the target data 1205 and the resampled data 205 as inputs, to generate one or more gradients (e.g., loss value 1225). Next, in block B1725, the neural-network-training device backpropagates the one or more gradients through the resampling ML model 252.

Then, in block B1730, the neural-network-training device determines if the training of the resampling ML model 252 is finished (e.g., if predefined stopping criteria are satisfied). If the neural-network-training device determines that the training of the resampling ML model 252 is not finished (B1730=No), then the flow returns to block B1710, where the neural-network-training device selects a Radon-space dataset 1203 and target data 1205 from the training dataset 1200, which may or may not have previously been used in any prior iterations of blocks B1715-B1725.

If the neural-network-training device determines that the training of the resampling ML model 252 is finished (B1730=Yes), then the flow proceeds to block B1735, where the neural-network-training device stores or outputs the trained resampling ML model 252, and the flow ends.

Also, the neural-network-training device may perform the operations in FIG. 17 for each resampling ML model 252 of a plurality of resampling ML models 252. And each of the resampling ML models 252 may have a respective training dataset 1200 (e.g., a training dataset 1200 for a corresponding material). Also, each resampling ML model's training dataset 1200 may be unique to that resampling ML model 252.

Figure 18:
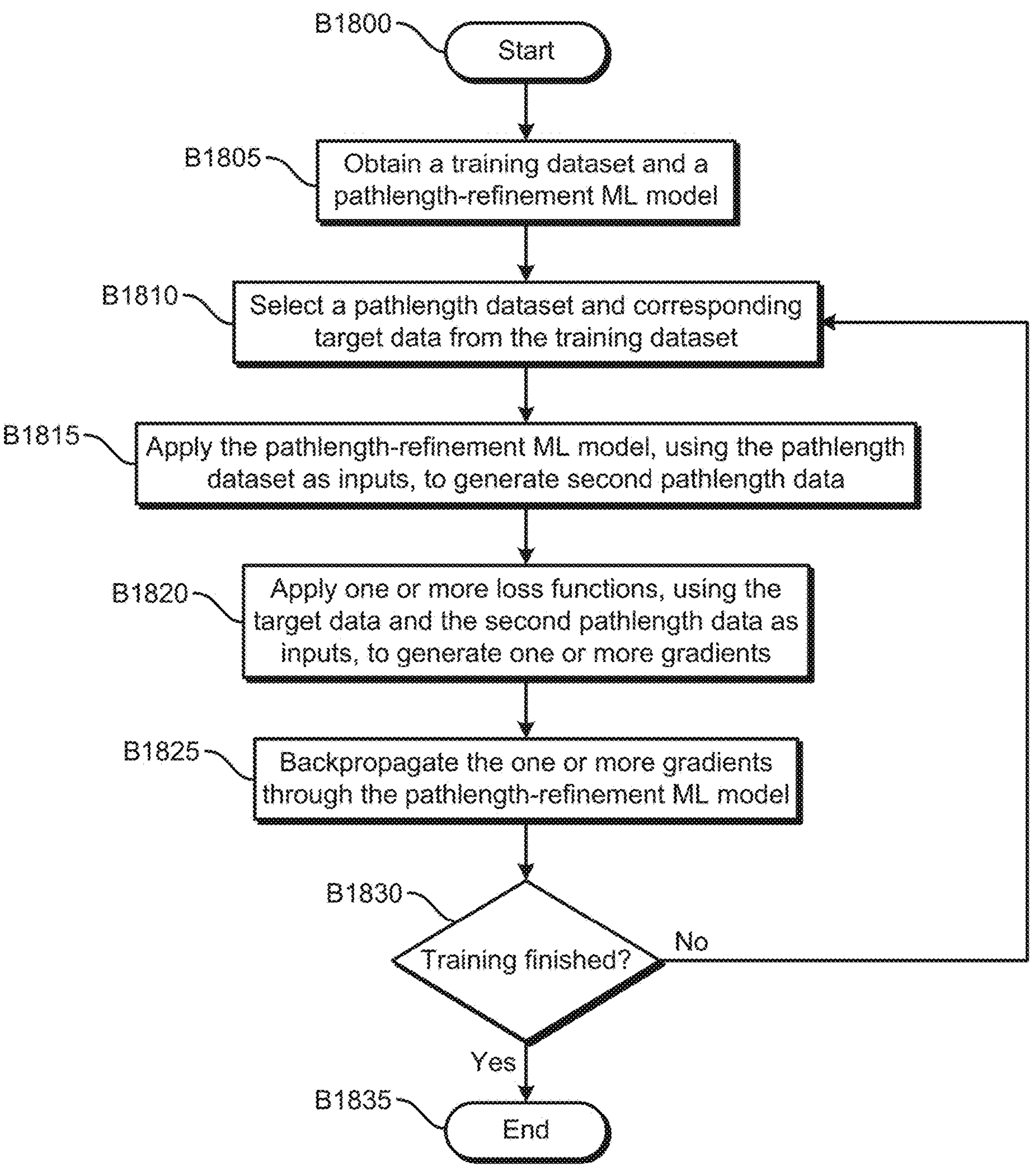
FIG. 18 illustrates an example embodiment of a method for training a pathlength-refinement ML model.

FIG. 18 illustrates an example embodiment of a method for training a pathlength-refinement ML model. Furthermore, although this operational flow is performed by a neural-network-training device, some embodiments of this operational flow are performed by two or more neural-network-training devices or by one or more other specially-configured computing devices.

The flow begins in block B1800 and then moves to block B1805, where a neural-network-training device obtains (e.g., retrieves from storage, receives from another device) a training dataset 1300 and a pathlength-refinement ML model 256. Next, in block B1810, the neural-network-training device selects a pathlength dataset 1303 (which includes a group of pathlength data) and target data 1305 from the training dataset 1300. The pathlength dataset 1303 and the target data 1305 correspond to each other.

The flow then advances to block B1815, where the neural-network-training device applies the pathlength-refinement ML model 256, using the pathlength dataset 1303 as inputs, to generate pathlength data 1307. The flow then moves to block B1820, where the neural-network-training device applies one or more loss functions 1320, using the target data 1305 and the pathlength data 1307 as inputs, to generate one or more gradients (which are examples of loss values 1325). Next, in block B1825, the neural-network-training device backpropagates the one or more gradients through the pathlength-refinement ML model 256.

Then, in block B1830, the neural-network-training device determines if the training of the pathlength-refinement ML model 256 is finished (e.g., if predefined stopping criteria are satisfied). If the neural-network-training device determines that the training of the pathlength-refinement ML model 256 is not finished (B1830=No), then the flow returns to block B1810, where the neural-network-training device selects a pathlength dataset 1303 and target data 1305 from the training dataset 1300, which may or may not have previously been used in any prior iterations of blocks B1815-B1825.

If the neural-network-training device determines that the training of the pathlength-refinement ML model 256 is finished (B1830=Yes), then the flow proceeds to block B1835, where the neural-network-training device stores or outputs the trained pathlength-refinement ML model 256, and the flow ends.

Also, the neural-network-training device may perform the operations in FIG. 18 for each pathlength-refinement ML model 256 of a plurality of pathlength-refinement ML models 256. And each of the pathlength-refinement ML models 256 may have a respective training dataset 1300 (e.g., a training dataset 1300 for a corresponding material). Also, each pathlength-refinement ML model's training data-set 1300 may be unique to that pathlength-refinement ML model 256.

Figure 19:
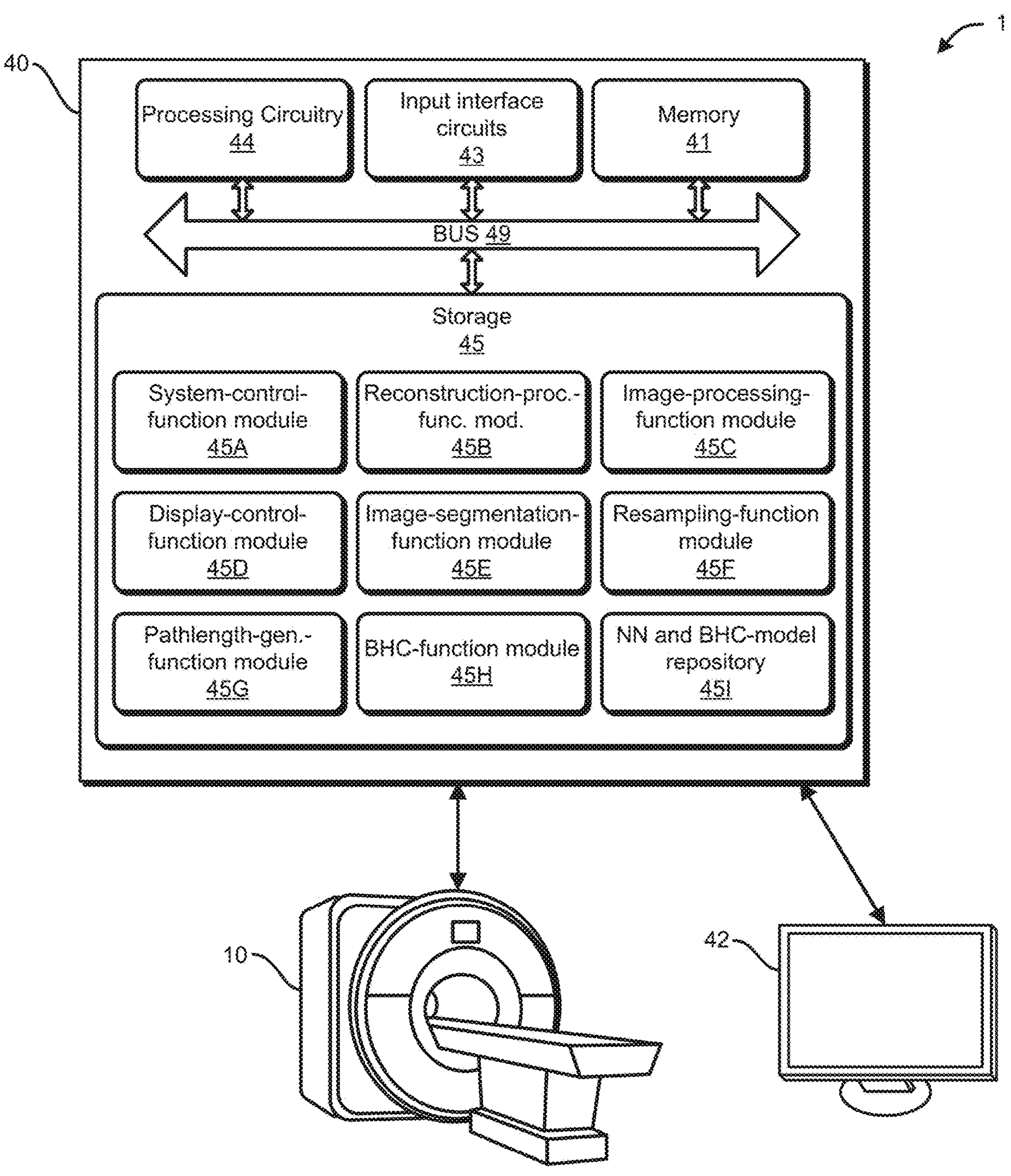
FIG. 19 illustrates an example embodiment of a medical-imaging system.

FIG. 19 illustrates an example embodiment of a medical-imaging system. In this example embodiment, the medical-imaging system realizes an X-ray CT apparatus 1.

The X-ray CT apparatus 1 includes a console 40, which is a specially-configured computing device; a gantry 10; and a display 42.

The console 40 includes processing circuitry 44, one or more input interface circuits 43, memory 41, and storage 45. Also, the hardware components of the console 40 communicate via one or more buses 49 or other electrical connections. Examples of buses 49 include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more input interface circuits 43 include communication components (e.g., a GPU, a network-interface controller) that communicate with the display 42, the gantry 10, a network (not illustrated), and other input or output devices (not illustrated), which may include a keyboard, a mouse, a printing device, a touch screen, a light pen, an optical-storage device, a scanner, a microphone, a drive, a joystick, and a control pad, for example.

The storage 45 includes one or more computer-readable storage media. As used herein, a computer-readable storage medium is a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 45, which may include both ROM and RAM, can store computer-readable data or computer-executable instructions. Also, the storage 45 is an example of a storage unit.

The console 40 additionally includes a system-control-function module 45A, a reconstruction-processing-function module 45B, an image-processing-function module 45C, a display-control-function module 45D, an image-segmentation-function module 45E, a resampling-function module 45F, a pathlength-generation-function module 45G, and a BHC-function module 45H. A module includes logic, computer-readable data, or computer-executable instructions. In the embodiment shown in FIG. 19, the modules are implemented in software (e.g., Assembly, C, C++, C#, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 45. Also, in some embodiments, the console 40 includes additional or fewer modules, the modules are combined into fewer modules, or the modules are divided into more modules. Furthermore, the storage 45 includes a neural-network (NN) and BHC-model repository 451, which stores neural networks (or other machine-learning models) and beam-hardening-correction models (e.g., BHC tables).

The system-control-function module 45A includes instructions that cause the applicable components (e.g., the processing circuitry 44, the input interface circuit 43, the memory 41) of the console 40 to control various functions of the gantry 10 and to perform various input and output functions, such as performing CT scans, which produce projection data; sending projection data to other devices; sending reconstructed-image data to other devices; and acquiring reconstructed-image data from other devices. For example, some embodiments of the system-control-function module 45A include instructions that cause the applicable components of the console 40 to perform at least some of the operations that are described in block B805 in FIG. 8, in block B905 in FIG. 9, in block B1005 in FIG. 10, and in block B1105 in FIG. 11. Also, the system-control-function module 45A may cause the applicable components of the console 40 to realize the system-control function 441 in FIG. 1. And the applicable components operating according to the system-control-function module 45A realize an example of a control unit.

The reconstruction-processing-function module 45B includes instructions that cause the applicable components (e.g., the processing circuitry 44, the memory 41) of the console 40 to perform a reconstruction process on projection data (e.g., detection data, preprocessed projection data, corrected projection data) to generate reconstructed-image data (e.g., corrected reconstructed-image data). And the instructions may cause the applicable components to perform preprocessing operations on projection data. For example, some embodiments of the reconstruction-processing-function module 45C include instructions that cause the applicable components of the console 40 to perform at least some of the operations that are described in blocks B300 and B370 in FIG. 3, in block B805 in FIG. 8, in block B905 in FIG. 9, in block B1005 in FIG. 10, and in block B1105 in FIG. 11. Also, the reconstruction-processing-function module 45C may cause the applicable components of the console 40 to realize the reconstruction-processing function 442 in FIG. 1. And the applicable components operating according to the reconstruction-processing-function module 45C realize an example of a reconstruction-processing unit.

The image-processing-function module 45C includes instructions that cause the applicable components (e.g., the processing circuitry 44, the memory 41) of the console 40 to generate tomographic-image data from reconstructed-image data. Also, the image-processing-function module 45C may cause the applicable components of the console 40 to realize the image-processing function 443 in FIG. 1. And the applicable components operating according to the image-processing-function module 45D realize an example of an image-processing unit.

The display-control-function module 45D includes instructions that cause the applicable components (e.g., the processing circuitry 44, the input interface circuit 43, the memory 41) of the console 40 to control the display 42 to display images (e.g., images that are based on tomographic-image data). Also, the display-control-function module 45D may cause the applicable components of the console 40 to realize the display-control function 444 in FIG. 1. And the applicable components operating according to the display-control-function module 45D realize an example of a display-control unit.

The image-segmentation-function module 45E includes instructions that cause the applicable components (e.g., the processing circuitry 44, the memory 41) of the console 40 to segment reconstructed-image data into groups of segmented-image data. For example, some embodiments of the image-segmentation-function module 45E include instructions that cause the applicable components of the console 40 to perform at least some of the operations that are described in block B310 in FIG. 3, in block B810 in FIG. 8, in block B910 in FIG. 9, in block B1010 in FIG. 10, and in block B1110 in FIG. 11. Also, the image-segmentation-function module 45E may cause the applicable components of the console 40 to realize the image-segmentation function 445 in FIG. 1. And the applicable components operating according to the image-segmentation-function module 45E realize an example of an image-segmentation unit.

The resampling-function model 45F includes instructions that cause the applicable components (e.g., the processing circuitry 44, the memory 41) of the console 40 to convert segmented-image data to a derivative of Radon space and to perform resampling that resamples data in the derivative of Radon space from a radial sampling pattern to a CBPG-shaped sampling pattern. For example, some embodiments of the resampling-function model 45F include instructions that cause the applicable components of the console 40 to perform at least some of the operations that are described in blocks B320 and B330 in FIG. 3, in blocks B500-B530 in FIG. 5, in blocks B815-B830 in FIG. 8, in blocks B915-B930 in FIG. 9, in blocks B1015-B1030 in FIG. 10, and in blocks B1115-B1130 in FIG. 11. Also, the resampling-function model 45F may cause the applicable components of the console 40 to realize the resampling function 446 in FIG. 1. And the applicable components operating according to the resampling-function model 45F realize an example of a resampling unit.

The pathlength-generation-function module 45G includes instructions that cause the applicable components (e.g., the processing circuitry 44, the memory 41) of the console 40 to generate groups of pathlength data (e.g., initial groups of pathlength data) based on groups of resampled data or to generate groups of second pathlength data based on groups of first pathlength data. For example, some embodiments of the pathlength-generation-function module 45G include instructions that cause the applicable components of the console 40 to perform at least some of the operations that are described in blocks B340-B350 in FIG. 3, in blocks B600-B630 in FIG. 6, in block B835 in FIG. 8, in blocks B935-B940 in FIG. 9, in blocks B1035-B1040 in FIG. 10, and in blocks B1120-B1130 in FIG. 11. Also, the pathlength-generation-function module 45G may cause the applicable components of the console 40 to realize the pathlength-generation function 447 in FIG. 1. And the applicable components operating according to the pathlength-generation-function module 45G realize an example of a pathlength-generation unit.

The BHC-function module 45H includes instructions that cause the applicable components (e.g., the processing circuitry 44, the memory 41) of the console 40 to perform beam-hardening correction on projection data based on the projection data, on pathlength data (e.g., second pathlength data), and, in some embodiments, on one or more beam-hardening-correction models (e.g., tables). For example, some embodiments of the BHC-function module 45H include instructions that cause the applicable components of the console 40 to perform at least some of the operations that are described in block B360 in FIG. 3, in block B850 in FIG. 8, in block B955 in FIG. 9, in block B1055 in FIG. 10, and in block B1155 in FIG. 11. Also, the BHC-function module 45H may cause the applicable components of the console 40 to realize the BHC function 448 in FIG. 1. And the applicable components operating according to the BHC-function module 45H realize an example of a BHC unit.

Figure 20:
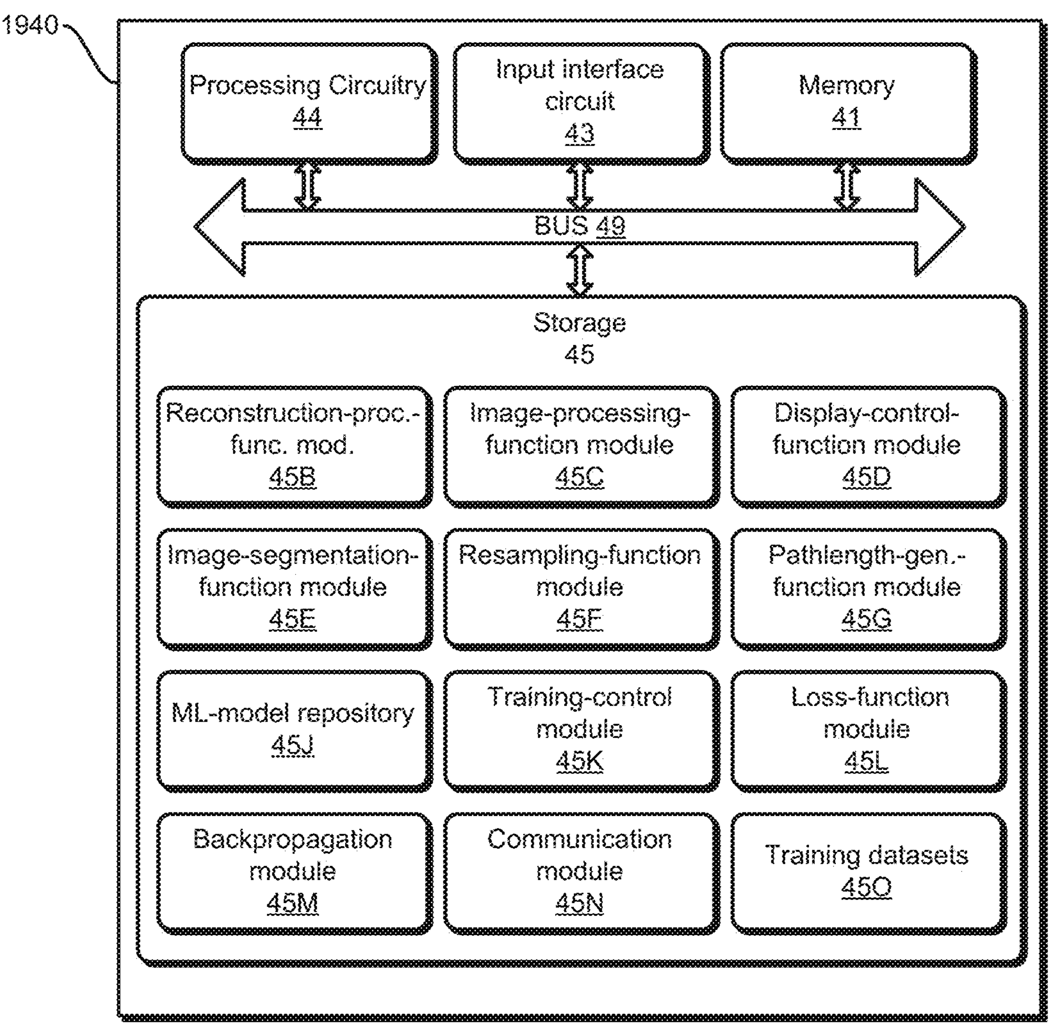
FIG. 20 illustrates an example embodiment of a neural-network-training device.

FIG. 20 illustrates an example embodiment of a neural-network-training device. The components of the neural-network-training device 1940 that have names and reference numbers that are identical to components of the console 40 are identical or similar to such components of the console 40, and, accordingly, further descriptions of such components are not included.

The neural-network-training device 1940 includes an ML-model repository 45J, a training-control module 45K, a loss-function module 45L, a backpropagation module 45M, a communication module 45N, and training datasets 45O. The training datasets 45O may include one or both of the training dataset 1200 in FIG. 12 and the training dataset 1300 in FIG. 13.

The training-control module 45K includes instructions that cause the applicable components (e.g., the processing circuitry 44, the memory 41) of the neural-network-training device 1940 to train one or more resampling ML models or train one or more pathlength-refinement ML models, as well as store any trained resampling ML models and pathlength-refinement ML models in the ML-model repository 45J. Also, to perform these operations, the training-control module 45K may invoke other modules (e.g., the reconstruction-processing-function module 45B, the image-segmentation-function module 45E, the resampling-function model 45F, the loss-function module 45L, the backpropagation module 45M). For example, some embodiments of the training-control module 45K include instructions that cause the applicable components of the neural-network-training device 1940 to perform the overall flow that is described in FIG. 17 or the overall flow that is described in FIG. 18 (again, note that the training-control module 45K invokes other modules to perform some of these operations). And the applicable components operating according to the training-control module 45K realize an example of a training-control unit.

The loss-function module 45L includes instructions that cause the applicable components (e.g., the processing circuitry 44, the memory 41) of the neural-network-training device 1940 to implement a loss function (e.g., loss function 1220 in FIG. 12) that outputs a loss value (e.g., a gradient)

based on input resampled data and on input target data or to implement a loss function (e.g., loss function 1320 in FIG. 13) that outputs a loss value (e.g., a gradient) based on input pathlength data (e.g., second pathlength data) and on input target data. For example, some embodiments of the loss-function module 45L include instructions that cause the applicable components of the neural-network-training device 1940 to perform at least some of the operations that are described in block B1720 in FIG. 17 and in block B1820 in FIG. 18. And the applicable components operating according to the loss-function module 45L realize an example of a loss-function unit.

The backpropagation module 45M includes instructions that cause the applicable components (e.g., the processing circuitry 44, the memory 41) of the neural-network-training device 1940 to backpropagate loss values through ML models (e.g., resampling ML models, pathlength-refinement ML models). For example, some embodiments of the backpropagation module 45M include instructions that cause the applicable components of the neural-network-training device 1940 to perform at least some of the operations that are described in block B1725 in FIG. 17 and in block B1825 in FIG. 18. And the applicable components operating according to the backpropagation module 45M realize an example of a backpropagation unit.

The communication module 45N includes instructions that cause the applicable components (e.g., the processing circuitry 44, the memory 41, the input interface circuit 43) of the neural-network-training device 1940 to communicate with other devices, such as consoles, servers, and databases. And the applicable components operating according to the communication module 45N realize an example of a communication unit.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Thus, the scope of the claims is not limited to the above-described embodiments and includes various modifications and equivalent arrangements.

The invention claimed is:

1. A method for generating computed-tomography (CT) data, the method comprising:

obtaining a group of reconstructed-image data;

converting the group of reconstructed-image data to a derivative of Radon space, thereby generating Radon-space data, wherein the Radon-space data have a radial sampling pattern in the derivative of Radon space;

generating resampled data by inputting the Radon-space data into a first trained machine-learning model for resampling Radon-space data, wherein the resampled data have a cone-beam-projection-geometry-shaped sampling pattern in the derivative of Radon space;

generating first pathlength data based on the resampled data;

generating second pathlength data by applying a second trained machine-learning model to the first pathlength data, wherein the second trained machine-learning model has been trained based on third pathlength data, wherein the third pathlength data were obtained by applying a pathlength-estimation process to one or more sets of reconstructed-image data, wherein the pathlength-estimation process includes ray tracing; and generating reconstructed-image data based on the second pathlength data and on projection data.

2. The method of claim 1, wherein converting the group of reconstructed-image data to the derivative of Radon space includes:

mapping the group of reconstructed-image data to Fourier space;

generating Fourier slices from the group of reconstructed-image image data that has been mapped to Fourier space;

generating scaled Fourier slices by scaling the Fourier slices; and performing radial inverse Fourier transforms on the scaled Fourier slices.

3. The method of claim 1, wherein generating the reconstructed-image data based on the second pathlength data and on the projection data includes performing beam-hardening correction on the projection data based on the second pathlength data and on the projection data.

4. The method of claim 1, wherein the group of reconstructed-image data is generated by segmenting a first set of reconstructed-image data into two or more groups of reconstructed-image data, and wherein the two or more groups of reconstructed-image data include the group of reconstructed-image data.

5. A medical image-processing method comprising:

obtaining a set of projection data that was generated by scanning an object;

generating a set of reconstructed-image data, wherein generating the set of reconstructed-image data includes performing a reconstruction process on the set of projection data;

obtaining first pathlength data by applying a first pathlength-estimation process to a group of reconstructed-image data from the set of reconstructed-image data, wherein the first pathlength-estimation process includes a Fourier-transform process;

generating second pathlength data by applying a first trained machine-learning model to the first pathlength data, wherein the first trained machine-learning model has been trained based on third pathlength data, wherein the third pathlength data were obtained by applying a second pathlength-estimation process to one or more sets of reconstructed-image data, and wherein the second pathlength-estimation process includes ray tracing;

obtaining corrected projection data by applying a beam-hardening-correction process to the set of projection data based on the second pathlength data; and generating corrected reconstructed-image data based on the corrected projection data.

6. The medical image-processing method of claim 5, wherein the first pathlength-estimation process includes:

converting the group of reconstructed-image data to a derivative of Radon space, thereby generating Radon-space data, wherein the Radon-space data have a radial sampling pattern in the derivative of Radon space;

generating resampled data by resampling the Radon-space data, wherein the resampled data have a cone-beam-projection-geometry-shaped sampling pattern in the derivative of Radon space; and generating the first pathlength data based on the resampled data.

7. The medical image-processing method of claim 6, wherein generating the resampled data includes inputting the Radon-space data into a second trained machine-learning model for resampling Radon-space data.

8. The medical image-processing method of claim 7, wherein the second trained machine-learning model is trained based on projection-space data obtained by a process including forward-projection processing based on reconstructed-image data and on Fourier-transform processing based on the reconstructed-image data.

9. An image-processing apparatus comprising:

one or more computer-readable storage media storing instructions; and one or more processors, wherein the one or more processors and the one or more computer-readable storage media are configured to control the apparatus to perform operations that include:

obtaining a set of projection data that was generated by scanning an object;

generating a set of reconstructed-image data, wherein generating the set of reconstructed-image data includes performing a reconstruction process on the set of projection data;

obtaining first pathlength data by applying a first pathlength-estimation process to a group of reconstructed-image data from the set of reconstructed-image data, wherein the first pathlength-estimation process includes a Fourier-transform process;

generating second pathlength data by applying a first trained machine-learning model to the first pathlength data, wherein the first trained machine-learning model has been trained based on third pathlength data, wherein the third pathlength data were obtained by applying a second pathlength-estimation process to one or more sets of reconstructed-image data, and wherein the second pathlength-estimation process includes ray tracing;

obtaining corrected projection data by applying a beam-hardening-correction process to the set of projection data based on the second pathlength data; and generating corrected reconstructed-image data based on the corrected projection data.

10. The image-processing apparatus of claim 9, wherein the first pathlength-estimation process includes:

converting the group of reconstructed-image data to a derivative of Radon space, thereby generating Radon-space data, wherein the Radon-space data have a radial sampling pattern in the derivative of Radon space;

generating resampled data by resampling the Radon-space data, wherein the resampled data have a cone-beam-projection-geometry-shaped sampling pattern in the derivative of Radon space; and generating the first pathlength data based on the resampled data.

11. The image-processing apparatus of claim 10, wherein generating the resampled data includes inputting the Radon-space data into a second trained machine-learning model for resampling Radon-space data.

12. A medical-image-processing method, the method comprising:

obtaining a set of projection data, wherein the set of projection data was generated by scanning an object;

generating a set of reconstructed-image data, wherein generating the set of reconstructed-image data includes performing a reconstruction process on the set of projection data;

obtaining first pathlength data corresponding to a specific material by applying a first pathlength-estimation process on a first group of reconstructed-image data from the set of reconstructed-image data, wherein the first pathlength-estimation process includes a Fourier transform;

obtaining second pathlength data corresponding to the specific material by applying a first trained machine-learning model to the first pathlength data, wherein the first trained machine-learning model has been trained based on third pathlength data, wherein the third pathlength data were obtained by applying a second pathlength-estimation process to one or more sets of reconstructed-image data, wherein the second pathlength-estimation process includes ray tracing;

generating corrected projection data, wherein generating the corrected projection data includes applying a beam-hardening-correction process to the set of projection data based on the second pathlength data; and generating corrected reconstructed-image data based on the corrected projection data.

13. The medical-image-processing method of claim 12, wherein the set of projection data was generated by scanning the object with cone-beam computed-tomography scanning.

14. The medical-image-processing method of claim 12, wherein the first pathlength-estimation process includes:

generating Radon-space data, which are defined in a derivative of Radon space, based on a Fourier-transform-based mapping of the first group of reconstructed-image data to the derivative of Radon space; and applying a reverse Grangeat reconstruction method to the Radon-space data.

15. The medical-image-processing method of claim 12, wherein the first group of reconstructed-image data is obtained by segmenting the set of reconstructed-image data into two or more groups of reconstructed-image data, wherein the two or more groups of reconstructed-image data include the first group of reconstructed-image data, and wherein each group of the two or more groups of reconstructed-image data corresponds to a specific material.

16. The medical-image-processing method of claim 15, wherein the first pathlength-estimation process includes:

generating first Radon-space data, which are defined in a derivative of Radon space, based on a Fourier-transform-based mapping of the first group of reconstructed-image data to the derivative of Radon space, wherein the first Radon-space data have a radial sampling pattern; and generating second Radon-space data based on the first Radon-space data, wherein generating the second Radon-space data includes applying a second trained machine-learning model to the first Radon-space data, and wherein the second Radon-space data have a cone-beam-projection-geometry-shaped sampling pattern.

17. The medical-image-processing method of claim 16, wherein the segmenting is based on voxel values in the reconstructed-image data.

* * * * *